United States Patent
Young

(10) Patent No.: US 8,203,116 B2
(45) Date of Patent: Jun. 19, 2012

(54) SCENE BASED NON-UNIFORMITY CORRECTION FOR INFRARED DETECTOR ARRAYS

(75) Inventor: Ching-Ju J. Young, Dallas, TX (US)

(73) Assignee: Raytheon Company, Waltham, MA (US)

( * ) Notice: Subject to any disclaimer, the term of this patent is extended or adjusted under 35 U.S.C. 154(b) by 106 days.

(21) Appl. No.: 12/907,390

(22) Filed: Oct. 19, 2010

(65) Prior Publication Data

US 2012/0091340 A1   Apr. 19, 2012

(51) Int. Cl.
 *H01J 40/14* (2006.01)
(52) U.S. Cl. ............ 250/252.1; 250/332; 250/334
(58) Field of Classification Search ............ 250/332
See application file for complete search history.

(56) References Cited

U.S. PATENT DOCUMENTS

| | | | |
|---|---|---|---|
| 5,925,875 A * | 7/1999 | Frey ............... | 250/208.1 |
| 5,925,880 A | 7/1999 | Young et al. | |
| 6,184,527 B1 | 2/2001 | Young | |
| 6,320,186 B1 | 11/2001 | Young et al. | |
| 6,507,018 B2 | 1/2003 | Young | |
| 7,016,550 B2 * | 3/2006 | Alderson et al. ....... | 382/274 |
| 7,995,859 B2 * | 8/2011 | Hogasten ............. | 382/275 |

* cited by examiner

*Primary Examiner* — David Porta
*Assistant Examiner* — Marcus Taningco
(74) *Attorney, Agent, or Firm* — Pierce Atwood LLP; Joseph M. Maraia, Esq.

(57) ABSTRACT

In various embodiments, a method and system for compensating non-uniformities among detector elements of a detector array, without the use of dither mirrors or requirement of scene motion for non-uniformity correction achieved by computing scene spatial gradient and temporal gradient of image frames of the scene captured by the detector array at different times, and utilizing both the scene spatial and temporal gradients in detailed local gradient processing. Such local gradient processing may include computing masks to preserve spatial scene details, while eliminating scene noise (e.g., fixed pattern noise) from the captured image frames and correcting non-uniformity among detector elements.

16 Claims, 15 Drawing Sheets

SCENE BASED NON-UNIFORMITY CORRECTION FOR INFRARED DETECTOR ARRAYS

BACKGROUND

This application is directed to infrared detectors, and more particularly to compensating for non-uniformities among detector elements of an infrared detector array.

Infrared detectors provide thermal images for temperature measurement and heat detection. They are used for various applications, such as for military, industrial, and medical applications. In its simplest form, an infrared detector is a device, such as a photosensitive diode, that generates an electric current when exposed to infrared radiation. This current is dependent on the intensity and wavelength of the radiation and can be used in many different ways to produce an infrared picture.

Infrared detectors may be configured as a single element (detector), a small array of elements, a long linear array, or a full two-dimensional array. When the detector is a full two-dimensional array, the entire image is recorded at once, and the array is referred to as a "staring" array. However, with smaller arrays, the image is scanned over the array. The small array requires a serial scan to sweep the image in two-dimensions, whereas the linear array requires a "pushboom" scan to sweep the image across the array in one dimension.

The current produced by an infrared detector is amplified and processed to provide a more useful detector output. The processing reduces interference due to external and internal causes, such as electrical noise.

The ideal response of an infrared detector array is that each detector element exhibit the same linear voltage response for given temperature changes in the irradiation of the array. However, one type of interference with a good detector signal is electrical noise due to detector non-uniformity among detector elements. The uniformity differences have both spatially and temporally dependent causes.

A number of methods have been tried for compensating non-uniformity of infrared detector arrays. Generally, all involve some sort of data processing. Some methods use a uniform calibration source, typically using a chopper and controlled temperature. Other methods are scene-based, which means that they use an image scene (with uniform temperature) comprised of one or more objects or patterns for calibration. Such image scene may provide better calibration than other methods for the detector array's non-linear response to temperature variation. The scene-based methods may be further categorized into mechanical and non-mechanical methods.

Mechanical methods include methods that use choppers (or defocused lens, which may be configured to blur the image scene, and thus providing a locally constant temperature of the scene), dither mirrors, or other devices to blur the scene or otherwise induce motion. The "dithered scan" method of non-uniformity compensation is a scene-based mechanical method. The detector array views a scene through suitable optics. During a given time frame, the incident flux is sensed by each detector element. At the end of the time frame, the array data is delivered for processing and the array is displaced ("dithered") a fixed distance, typically a distance equal to the width or height of one detector element, in either the horizontal or vertical direction. Conventional dither scan methods assume the scene flux to be stable throughout the dither cycle. Thus, during the next time frame, each detector element is exposed to the flux seen by one of its neighbors during the prior time frame. These detector pairs can be "linked" analytically, such as by averaging their outputs. By a suitable choice of a dither pattern, each detector can be linked with one or more of its neighbors, to adjust gain and offset differences. Dithered scan methods are described in U.S. Pat. No. 5,925,880, to C. J. Young, et al., entitled "Non-Uniformity Compensation for Infrared Detector Arrays".

Scene-based non-mechanical methods may be based not only on scene information, but also information related to continuous scene or platform motion. These methods have included temporal high pass filtering, neural networks, and constant statistics. What is needed is a system and method for compensating non-uniformities among detector array elements without the use of dither mirrors (or other mechanical methods), and without the requirement of continuous motion in the scene exposed to the detector array.

SUMMARY

In one or more embodiments, this disclosure provides embodiments of a system and method which does not require dither mirrors or scene motion for correcting non-uniformities among detector elements of a detector array. In some embodiments, the non-uniformity correction is achieved by computing scene gradient and temporal gradient of image frames of the scene captured by the detector array at different times, and utilizing both the scene and temporal gradients in detailed local gradient processing. Such local gradient processing, as described in detail below, may result in effective reduction of detector noise (e.g., fixed pattern noise) as well as preservation of spatial scene gradient, which may be lost in conventional non-uniformity correction methods.

In one or more embodiments of this disclosure, the system for compensating non-uniformities among detector elements of a detector array includes an image frame memory, a correction unit, a delta-frame unit, a gradient-calculation unit, a gradient-processing unit, a delta-correction unit, and an update unit. The detector array may capture successive image frames of a scene, and each detector element of the array may have at least one neighbor. The detector array may be a one-dimensional linear array or a two-dimensional planar array. In some embodiments, only local scene data is used to compensate for non-uniformities for only a portion of detection elements of the array. The most recent image frame captured by the detector array may be identified as a current image frame, and one or more image frames previously captured by the detector array may be stored in the image frame memory. As such, the current image frame and one of the previous image frames (provided, e.g., by the image frame memory) may be image frames captured by the detector array at different times (e.g., consecutive times). The current and previous image frames may be represented as respective matrices each containing image pixel values representing output signals from the detector array.

The correction unit may apply a plurality of predetermined correction terms to the current frame and the previous frame to generate a corrected current frame and a corrected previous frame. The delta-frame unit may generate a delta frame using the current frame and the previous frame, e.g., by differencing the current and previous frames. In some embodiments, the gradient-calculation unit may compute a previous-frame gradient matrix of the corrected previous frame in a first direction, a current-frame gradient matrix of the corrected current frame in a second direction, and a first delta-frame gradient matrix in the first direction and a second delta-frame gradient matrix in the second direction of the delta frame. The second direction may be opposite to the first direction.

In some embodiments, the gradient-processing unit computes a first mask and a second mask. The first mask may preserve scene-gradient information (e.g., spatial and temporal information) of a scene associated with the corrected previous frame in the first direction, and the second mask may preserve the scene-gradient information associated with the corrected current frame in the second direction. The first mask may be generated using the previous-frame gradient matrix and the first delta-frame gradient matrix, e.g., by comparing values of the previous-frame gradient matrix and values of the first delta-frame gradient matrix with a predetermined threshold value. In some embodiments, the threshold value is a function (e.g., standard deviation) of frame noise of the delta frame. Similarly, the second mask may be generated using the current-frame gradient matrix and the second delta-frame gradient matrix, e.g., by comparing values of the current-frame gradient matrix and values of the second delta-frame gradient matrix with the predetermined threshold value.

The delta-correction unit may compute a plurality of delta-correction values, which may be a function of the previous-frame gradient matrix, the current-frame gradient matrix, and the first and second masks. In some embodiments, each of the plurality of delta-correction values is associated with a different one of the detector elements of the array. The update unit may then update each of the plurality of predetermined correction terms with a corresponding delta-correction value.

In some embodiments, if the detector array is a two-dimensional planar array, the system further executes non-uniformity compensation for the detector array, such that the system units (discussed above) perform their respective functions for a third direction and a fourth direction. The third and fourth directions may be perpendicular to the first and second directions, respectively.

In another embodiment, a ditherless method of compensating non-uniformities among detector elements of a detector array includes receiving a (presently-detected) current image frame, and a previous image frame from an image frame memory. The detector array may capture successive image frames of a scene, and each detector element of the array may have at least one neighbor. In some embodiments, the current and previous frames are image frames captured by the detector array at different times and are represented as respective matrices each containing image pixel values representing output signals from the detector array. A plurality of predetermined correction terms may be applied, at a correction unit, to the current frame and the previous frame to generate a corrected current frame and a corrected previous frame. Thereafter, a delta frame may be generated using the current frame and the previous frame, e.g., by differencing the current and previous frames.

A previous-frame gradient matrix of the corrected previous frame may be computed (e.g., at a gradient-calculation unit) in a first direction, and a current-frame gradient matrix of the corrected current frame may be computed in a second direction. Additionally, a first delta-frame gradient matrix in the first direction and a second delta-frame gradient matrix in the second direction of the delta frame is computed. The second direction may be opposite to the first direction. In some embodiments, at a gradient-processing unit, a first mask is computed using the previous-frame gradient matrix and the first delta-frame gradient matrix. Similarly, a second mask is computed using the current-frame gradient matrix and the second delta-frame gradient matrix. The first mask may preserve scene-gradient information of a scene associated with the corrected previous frame in the first direction, and the second mask may preserve the scene-gradient information associated with the corrected current frame in the second direction.

In some embodiments, at a delta-correction unit, a plurality of delta-correction values may be computed as a function of the previous-frame gradient matrix, the current-frame gradient matrix, and the first and second masks. Each of the plurality of delta-correction values may be associated with a different one of the detector elements of the array. And, at an update unit, each of the plurality of predetermined correction terms may be updated with a corresponding delta-correction value.

In some embodiments, if the detector array is a two-dimensional planar array, a new cycle of non-uniformity compensation using the previous and current frames is executed for a third and a fourth direction. The third and fourth directions may be perpendicular to the first and second directions, respectively.

BRIEF DISCUSSION OF THE DRAWINGS

DETAILED DESCRIPTION

Various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions, in fact, result from computing devices, processors, controllers, or other devices executing the firmware, software, routines, or instructions.

The following description is of systems and methods of compensating for detector element non-uniformities of an infrared detector array. Although, non-uniformity compensation (NUC) algorithms described here may be similar to dither scan methods, they eliminate the need for mechanical dithering and the requirement of a moving scene and/or scene motion detection for non-uniformity correction. It is based on a recognition that, by utilizing scene spatial and temporal gradients, masks that preserve scene spatial details and motion information may be computed. These masks may eliminate the need for mechanical dithering (which generates motion with a predefined or known pattern) or motion detection using multiple frames for non-mechanical dither correction (which generates random or unknown motion). Examples of suitable NUC algorithms are described below, with additional detail set out in U.S. Pat. No. 5,925,880, entitled Non-Uniformity Compensation for Infrared Detector Arrays", to C. J. Young, et al.; in U.S. Pat. No. 6,320,186, entitled "Improved Methods of Non-Uniformity Compensation for Infrared Detector Arrays", to C. J. Young, et al.; and in U.S. Pat. No. 6,507,018, entitled "Ditherless Non-Uniformity Compensation for Infrared Detector Arrays with Recursive Spatial Low Pass Filtering", to C. J. Young, all incorporated by reference herein.

Figure 1A:
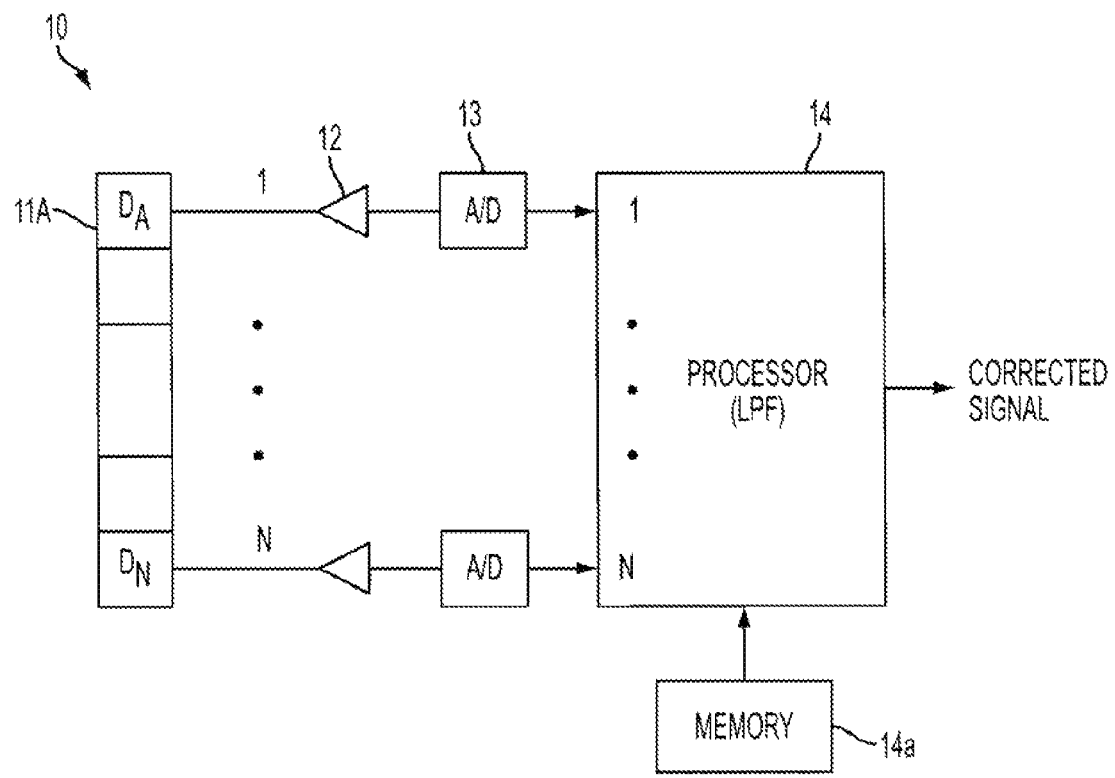
FIGS. 1a and 1b are block diagrams of exemplary infrared detector systems in accordance with an embodiment of this disclosure.

FIG. 1A is a block diagram of infrared detector system 10 including a one-dimensional detector array in accordance with some embodiments described in this disclosure. Detector array 11A has a number of individual detector elements $D_A$-$D_N$. In the embodiment shown in FIG. 1A, array 11A scans a scene horizontally. However, as explained below, array 11A may be configured for vertical scene scanning.

Each detector element $D_A$-$D_N$ of array 11A provides a response signal, indicating flux irradiance, on a separate channel. Each channel has amplifier 12 and analog-to-digital converter 13 that samples the signal. The N data signals are delivered in parallel to processor 14. At each time, t, the data received by processor 14 are pixel values representing intensity a given sample time.

It is assumed that detector elements $D_A$-$D_N$ of array 11A have non-uniform responses. That is, at least two of the detector elements (or all of them to one extent or another) do not provide the same response to a given temperature in the scene. The system (and method) described in this disclosure is designed to compensate for these non-uniformities regardless of whether they are linear or non-linear. Such non-uniformity correction may include gain correction and/or offset correction for each detector element of the detector array.

Processor 14 may be any device capable of performing the mathematical operations (described below) to calculate a gain correction value and an offset correction value (and update the offset correction value) for each detector element of the detector array. Processor 14 may be a general purpose processor programmed to perform the appropriate operations with programming stored in memory 14a. Memory 14a may be a non-volatile device including one or more of a programmable read-only memory (PROM) device, an erasable PROM (EPROM) device, and an electrically erasable PROM (EEPROM) device. In some embodiments, processor 14 may be dedicated logic circuitry or of some combination of software and hardware driven devices.

The output of processor 14 is a corrected signal, from which an output to-be-displayed image can be generated. For example, the output image may be obtained by correcting the captured frames by, e.g., multiplying each detector element's response value (i.e., captured pixel value) by its calculated gain correction value and by subtracting its updated offset correction value. The embodiments of this description are designed to provide real time correction for displayed images, but the same processing could be applied for stored image data.

Figure 1B:
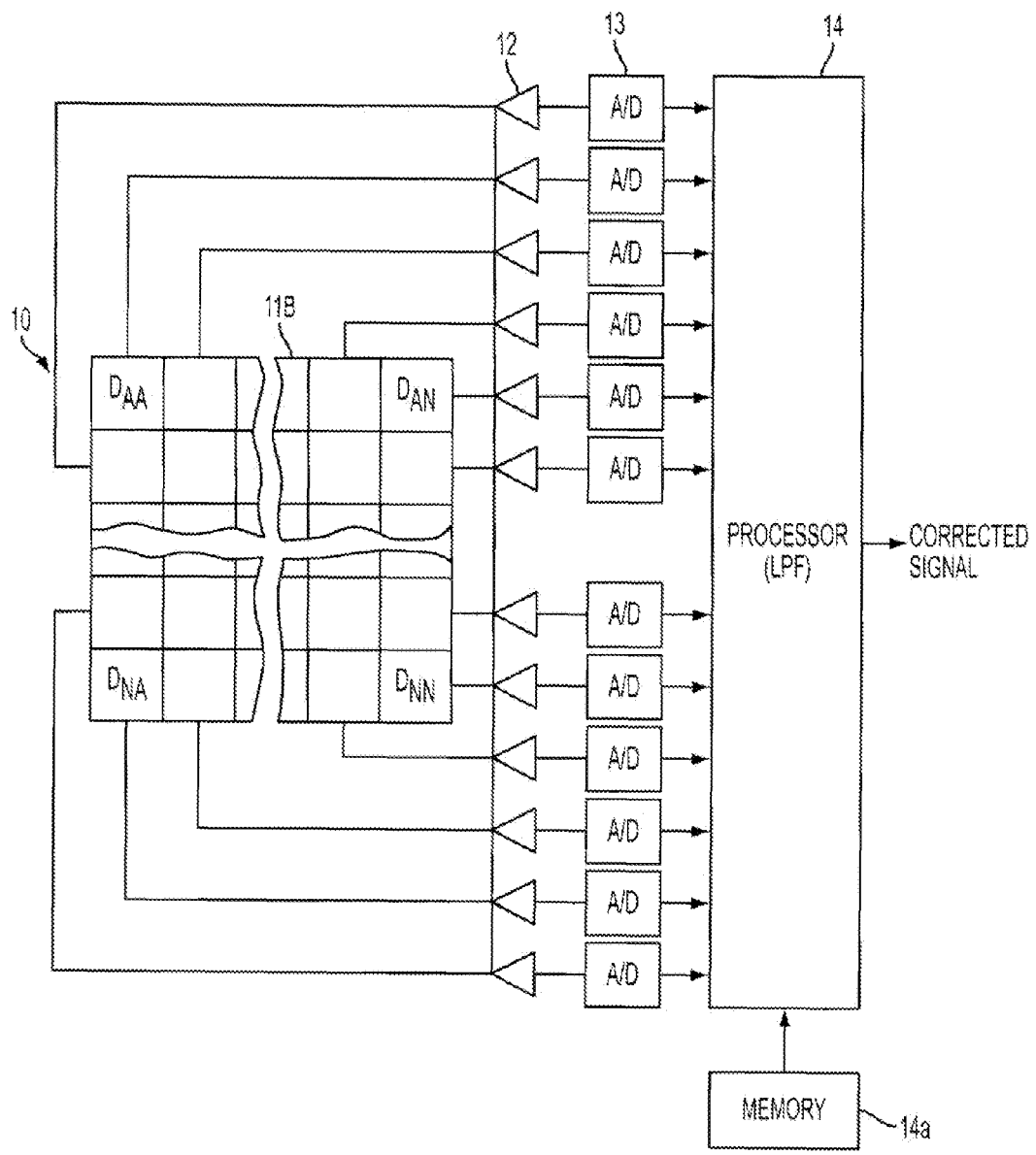

FIG. 1B illustrates an infrared detector system, also identified as system 10, including a two-dimensional detector array in accordance with some embodiments of this disclosure. The basic elements of the system are the same as in FIG. 1A, except that the detector array 11B is a two-dimensional array. Such arrays are sometimes referred to as "staring" arrays because there is no need for scanning as in the case of one-dimensional arrays. As explained below, the essential concepts of the non-uniformity correction (NUC) algorithms including calculation of offset correction values described herein apply to both one-dimensional and two-dimensional arrays.

Figure 1C:
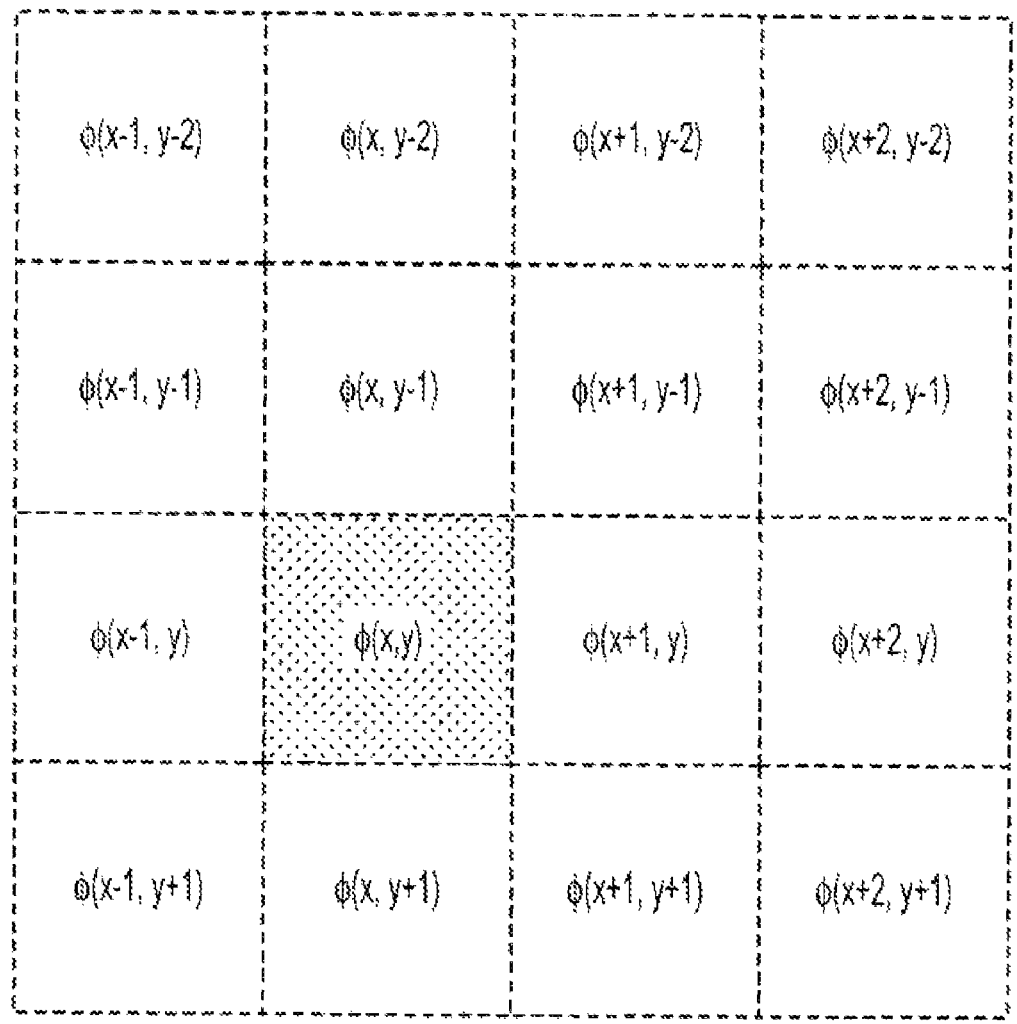
FIG. 1c illustrates a portion of a scene to be viewed by a one-dimensional or two-dimensional detector array.

FIG. 1C illustrates a portion of a scene to be viewed by a detector array, such as array 11A or array 11B. The scene is divided into a number of pixels, each representing an area whose irradiance flux is sensed by a detector element of the array. For simplicity of illustration, only the pixels sensed by a 4×4 portion of detector elements are explicitly illustrated. In practice, a number of pixels corresponding to a scan (or stare) of the array comprises an image "field" or "frame." The true flux incident upon each pixel, indexed by its row-column position in the array, is (x,y). The pixel values for two adjacent pixels, at (x,y) and at (x+1,y), are shown as being dark gray and light gray, respectively.

Figure 2A:
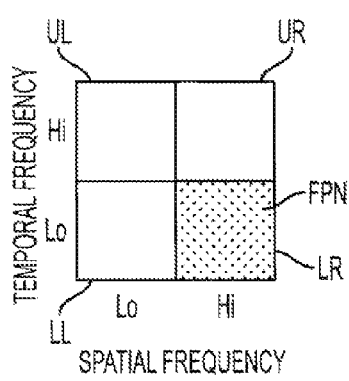
FIGS. 2a-2c illustrate analysis of fixed pattern noise from detector non-uniformity, and spatial and temporal characteristics of fixed pattern noise, a stationary scene and a moving scene, in terms of spatial-temporal frequency quadrants.

FIG. 2 illustrates how fixed pattern noise (FPN) from detector non-uniformity, and scene information including spatial and temporal image characteristics, can be analyzed in terms of frequency quadrants. As shown in FIG. 2a, the fixed pattern noise is high frequency in spatial domain, but low frequency in temporal domain.

Figure 2B:
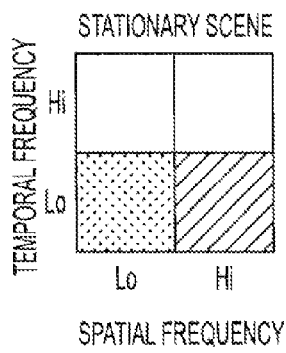

Referring to FIG. 2b, the scene may have both low spatial frequency contents (such as clouds, sky, background at distance) and high spatial frequency information (such as buildings, bridges, and other man made objects). The latter contents are usually of more interest to the observer. If there is no motion, all low spatial frequency and high spatial frequency scenes will be stationary, i.e. not changing its pixel (i.e., scene irradiance received and detected by the corresponding detector element) location rapidly from one field (or frame) to the next. This is temporally low frequency.

Accordingly, FPN residing in the LR frequency quadrant may interfere with a scene residing in the LR quadrant. Specifically, FPN may interfere with high spatial frequency component of the scene. However, if there is motion in the scene, the motion may segregate high spatial scene frequency part from FPN with little effect to low spatial scene frequency part. For example, a detector element seeing a moving vehicle or a flying bird (a high spatial frequency object) at time t, may not be able to record the same information at time t+1. Motion may cause the object to change its position in the scene to be seen by a neighboring detector element. When a detector element sees a foreground object (representing high spatial frequency) at t, and then sees a background (representing low spatial frequency) at t+1, the result is high temporal frequency in the scene, as the received signals for that detector element change from frame to frame.

Figure 2C:
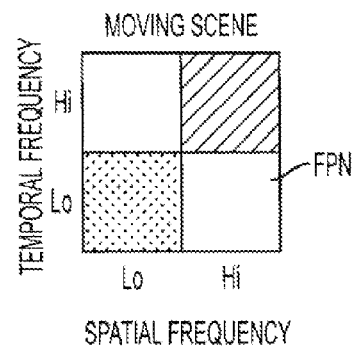

Thus, motion pushes the high spatial frequency scene from low temporal frequency quadrant (LR quadrant) to high temporal frequency quadrant (UR quadrant). Now the scene information resides in the LL and UR quadrants and fixed pattern noise may still be in the LR quadrant (as shown in FIG. 2c), thus FPN can be separated from the scene with a recursive spatial low-pass filter algorithm including gradient computations and proper local gradient processing. Such spatial low-pass filtering include frame differencing (of detector-captured frames) to generate a delta frame, shifted frame differencing to generate spatial gradients for the captured frames and the delta frame. These gradients may be used in local gradient processing to compute "masks," to preserve high spatial frequency scene information while eliminating FPN.

The NUC algorithms may use information of neighboring pixels (i.e., one or two pixels away from the pixel being processed). The neighbors may be bi-directional, i.e., neighbors from opposite directions. For two-dimensional detector arrays, the NUC algorithms may further include computing offset correction values using orthogonal neighbors, i.e., alternating the use of neighbor pixel values from one dimension (e.g., horizontal dimension) and use of neighbor pixel values from another dimension (e.g., vertical dimension, such that the vertical dimension is perpendicular to the horizontal dimension). In the same sense, diagonal neighbors could be bi-directional and orthogonal to a particular detector element, i.e., its NE, NW, SE, and SW neighbors. The simplest forms of the algorithm use two frames of captured data, although the NUC algorithm described below can be configured to process more than two image frames. The NUC algorithms of this disclosure may be recursive, such that near-neighbor processing gradually grows to a larger neighborhood (i.e., more than one or two neighboring pixels), and eventually reaches the entire array.

Figure 3:
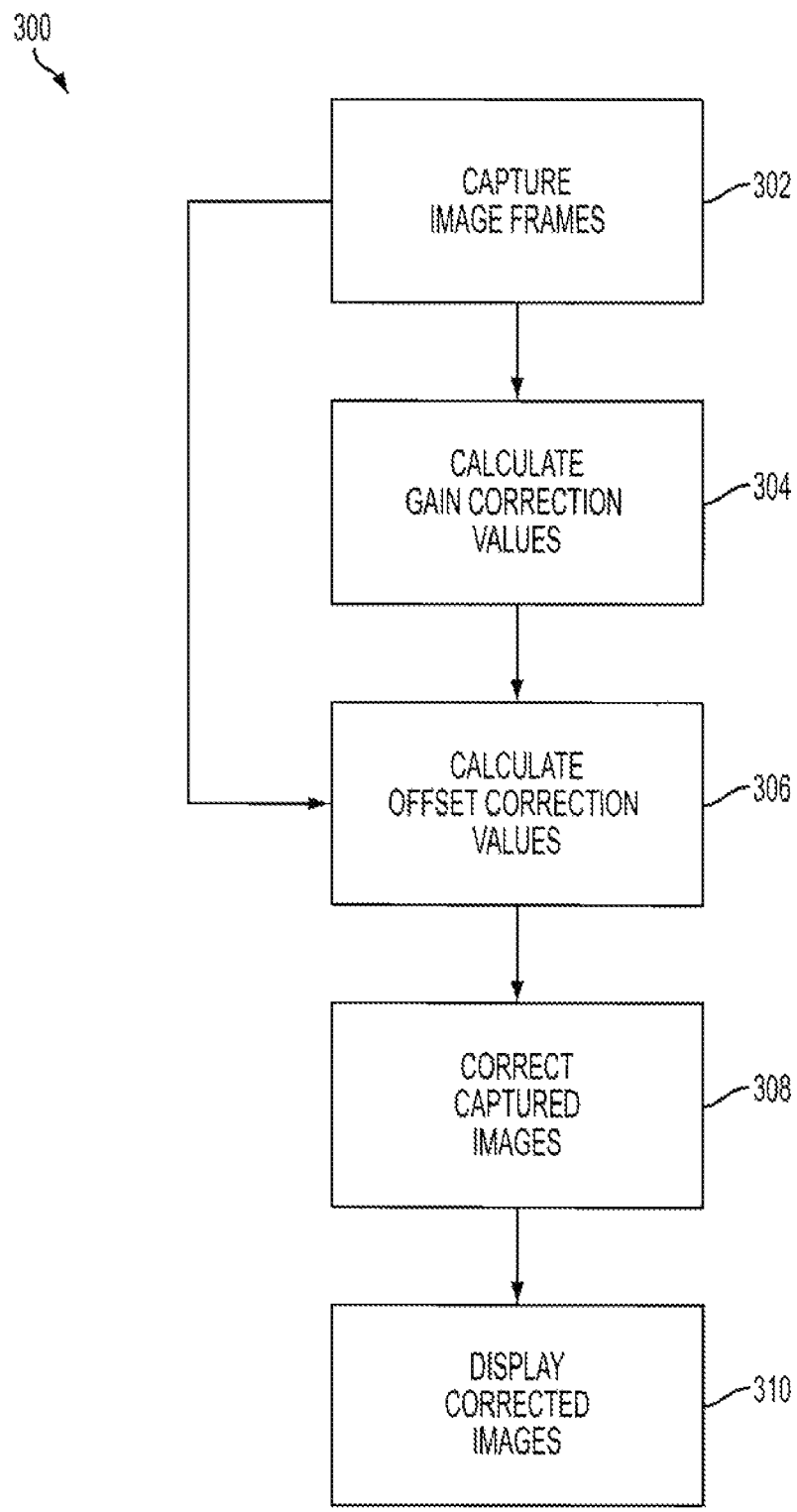
FIG. 3 illustrates the basic steps of non-uniformity compensation in accordance with an embodiment of this disclosure.

FIG. 3 illustrates the basic steps of non-uniformity compensation for detector array 11A or 11B, using a low-pass filter type NUC algorithm executed, e.g., by processor 14. In step 302, two or more image frames of data (e.g., a current frame and a previous frame) are captured using the detector array (e.g., array 11A or 11B). The current and previous frames each are one-dimensional matrices, if captured by a one-dimensional detector array (e.g., array 11A), or are two-dimensional matrices, if captured by a two-dimensional detector array (e.g., array 11B). The current and previous frames may be successive frames of the scene captured at different times, and may be stored in memory 14a for further retrieval and processing.

As part of the NUC algorithm, gain correction values and offset correction values are calculated for the current and previous frames, in steps 304 and 306, respectively. In some embodiments, a gain correction value for each detector element is calculated before the offset correction values. This is because the offset errors may not affect the gain calculation. The calculation of gain and offset correction values may not necessarily be synchronous with display of the image. For example, the iterations for gain correction values (step 304) may be repeated until they converge, e.g., to a stable or constant value, then the iterations for offset correction values (step 306) may be repeated until they converge, e.g., to a stable or constant value, before the image is corrected (step 308) and displayed (step 310). Thus, pixel data of current and previous frames are received and stored, e.g., in memory 14a, and the steps 304, 306 of the NUC algorithm are performed, before the data is corrected for display. Alternatively, uncorrected data and partially corrected data may be displayed as the iterations of steps 304, 306 are being performed. Also, the data may be output for further processing or storage in memory (e.g., memory 14a). The decision of when to use the gain and offset correction values to generate a display is a matter of time or memory constraints, or of the overall system configuration. Moreover, in practice, gain non-uniformities are not expected to be as big as offset non-uniformities, and a rather smoothed gain matrix should be obtained in a few iterations. In some embodiments, offset correction is anticipated to be applied continuously. Gain errors may be corrected in the beginning of an image sequence, or when there is major change in scene radiance. The residual gain errors may also be smoothed out in the offset correction iterations.

Details about the suitable algorithms for calculating gain correction values (step 304) for one-dimensional and two-dimensional detector arrays can be found in U.S. Pat. No. 5,925,880, entitled Non-Uniformity Compensation for Infrared Detector Arrays", to C. J. Young, et al.; in U.S. Pat. No. 6,320,186, entitled "Improved Methods of Non-Uniformity Compensation for Infrared Detector Arrays", to C. J. Young, et al.; and in U.S. Pat. No. 6,507,018, entitled "Ditherless Non-Uniformity Compensation for Infrared Detector Arrays with Recursive Spatial Low Pass Filtering", to C. J. Young, all incorporated by reference herein.

Figure 4:
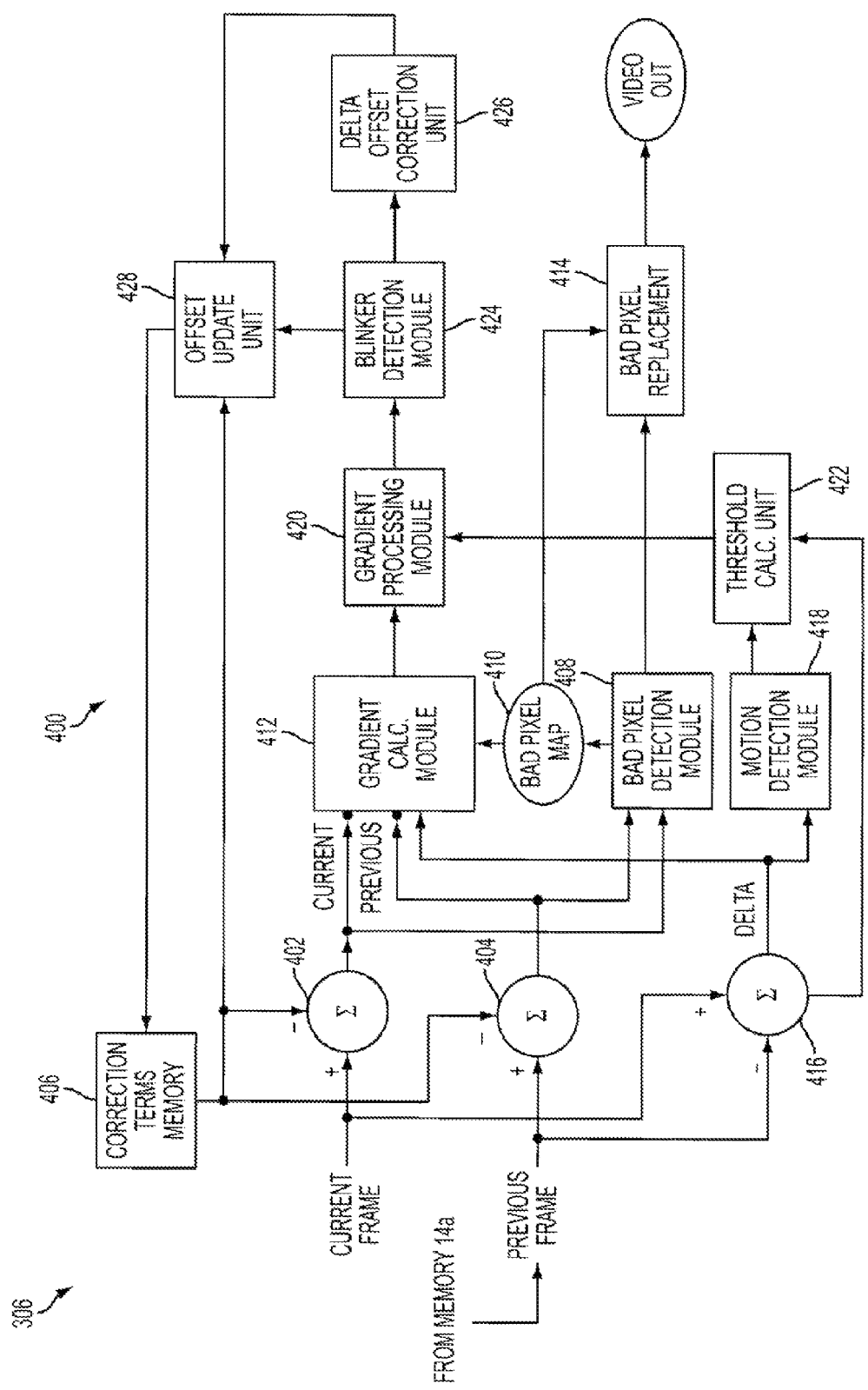
FIG. 4 is a block diagram of exemplary system to calculate offset correction values for an infrared detector system in accordance with an embodiment of this disclosure.

As discussed above, in step 306, offset correction values for current and previous frames captured by the detector array are calculated. FIG. 4 illustrates a block diagram of an exemplary system 400 for calculating and updating offset correction values of step 306. In some embodiments, system 400 is implemented within, or is operatively associated with processor 14. As shown, system 400 receives as input current and previous frames captured by the detector array (step 302). As part of the pre-processing of the captured frames, any gain and/or offset correction value obtained from factory calibration (e.g., calculated the manufacturing of the detector array) is applied on the current and previous frames. Additionally, if the current frames is not the first captured frame of the scene, offset correction values from the last iteration of offset calculation in system 400 (for the preceding set of current and previous frames) may also be applied to the current and previous frames. Accordingly, the offset correction values may be subtracted from the current and previous frames using adders 402, 404, respectively, to generate a corrected current frame and a corrected previous frame. Such pre-calculated offset correction values may be stored in correction terms memory 406, which may be part of memory 14a, or may be an independent memory device within system 400.

In the captured (and corrected) current frame, there may be one or more "bad" pixels, which may be recorded by the respective detector element that had response to some thermal reference deviated far from the averaged response from the entire array (or a large surrounding region of the detector array). Similarly, there may be one or more "noisy" pixels, which may be recorded by the respective detector element such that the standard deviation of the pixel's temporal response is much larger than the standard deviation of the pixels recorded by its neighboring detectors for the same temporal scene variation. Such bad and noisy pixels may be identified by bad pixel detection module 408, so that the bad and noisy pixel values may be excluded from the calculation of offset correction values in system 400. Identification of the bad and noisy pixels may be tracked and recorded using bad pixel map 410.

To identify bad pixels based on image spatial statistics, first, a dead or bad pixel map 410 is initialized as zero. The dead pixel map is a matrix of same size as the current image frame, and a value in the dead pixel map is recorded equal to one when a corresponding pixel is identified as a bad pixel by module 408. In other words, the dead pixel map may be defined as:

$$D_{ij} = 1 \text{ if pixel}(i, j) \text{ is dead pixel}$$
$$= 0 \text{ if pixel}(i, j) \text{ is valid pixel}$$

In bad pixel detection module 408, an integrated image (denoted as iP in equations below) for a pixel at location (i,j) in the current frame may be computed by integrating pixel values from upper left corner of the corrected current image frame (indicated as I in the following equations), i.e., from pixel location (1,1), to a pixel location (i,j). Pre-identified dead pixels may be excluded during this pixel integration.

$$iP_{ij} = \sum_{p=1}^{i} \sum_{q=1}^{j} (1 - D_{ij}) I_{pq} \quad (1)$$

Similarly, integrated pixel counts (iC) and integrated pixel squares (iS) may be computed as:

$$iC_{ij} = \sum_{p=1}^{i} \sum_{q=1}^{j} (1 - D_{ij}) \quad (2)$$

$$iS_{ij} = \sum_{p=1}^{i} \sum_{q=1}^{j} (1 - D_{ij}) I_{pq}^2$$

Accordingly, for a pixel at location (i,j), bad pixel detection module 408 may be configured to define a local region of the pixel (i,j), and compute local region sum using the corresponding integrated image. For example, for pixel (i,j), local region is defined as (2h+1)×(2w+1), where h is half height to pixel (i,j) and w is half width to pixel (i,j). Also, for pixel (i,j), it's four corners are defined as:

$$UL=(i-h-1,j-w-1)$$

$$UR=(i-h-1,j+w)$$

$$LL=(i+h,j-w-1)$$

$$LR=(i+h,j+w)$$

Based on the defined local region, local region sum may be computed as using integrated sums for the four corners defined above. For example, the local region sum (P) for pixel (i,j) may be computed as:

$$P_{ij}=iP_{UL}+iP_{LR}-iP_{LL}-iP_{UR}-I_{ij},$$

where $iP_x$ indicates the integrated sum calculated for pixel x using eq. 1 above. Similarly, pixel counts (C) and pixel squares (S) for the local region may be calculated as:

$$C_{ij}=iC_{UL}+iC_{LR}-iC_{LL}-iC_{UR}-(1-D_{ij})$$

$$S_{ij}=iS_{UL}+iS_{LR}-iS_{LL}-iS_{UR}-I_{ij}^2,$$

where $iC_x$ and $iS_x$ indicate the integrated pixel counts and integrated squares, respectively, calculated for pixel x using eq. 2 above.

Further, spatial statistics, e.g., local pixel mean $\mu_{ij}$ and local pixel sigma $\sigma_{ij}$ of the local region are computed as:

$$\mu_{ij}=P_{ij}/C_{ij}$$

$$\sigma_{ij}=\sqrt{S_{ij}/C_{ij}-\mu_{ij}\mu_{ij}}$$

Pixel (i,j) may be defined as a bad pixel if the pixel value difference from local pixel mean $\mu_{ij}$ is much greater than local pixel sigma $\sigma_{ij}$. Accordingly, the dead pixel map is updated based on the following equation:

$$D_{ij}=1 \text{ if } (I_{ij}-\mu_{ij})>f\sigma_{ij},$$

where f is the pixel sigma ratio to classify bad pixels (which, by default, may be set equal to 2.5).

In addition to, or as an alternative to identifying bad pixels based on image spatial statistics, bad pixels may be identified on image temporal statistics of a sequence of image frames. Accordingly, if a pixel's temporal mean is much larger than average temporal mean from the entire array, the pixel may be identified as a bad pixel. Additional, or alternatively, if a pixel's temporal variance is much larger than the mean variance from its neighboring pixels, the pixel may be identified as a bad pixel. To identify bad pixels in the current frame, a sequence of frames (excluding the current and previous frames) and the corrected current and previous frames may be accessed by bad pixel detection module 408 from memory 14a. As discussed above, the identification of the bad pixels in the current frame may be tracked and recorded using bad pixel map 410, labeled as D in the equation below. All values in the bad pixel map is initialized equal to zero, and a bad pixel value in the map is changed to one, if the corresponding pixel is identified as the bad (or noisy) pixel. In other words, the dead pixel map may be defined as:

$$D_{ij} = 1 \text{ if pixel}(i, j) \text{ is dead pixel}$$

$$= 0 \text{ if pixel}(i, j) \text{ is valid pixel.}$$

First, temporal mean (m) of each pixel (i,j) of the current frame, m(i,j), is calculated as the temporally averaged response of image values at pixel location (i,j) from the first frame of the sequence (frame number 1) to the corrected current frame (frame number n) of the frame sequence. The temporal mean is computed as:

$$m_1(i, j) = I_1(i, j)$$

$$m_2(i, j) = \frac{1}{2}[I_1(i, j) + I_2(i, j)] = \frac{1}{2}I_2(i, j) + \frac{1}{2}m_1(i, j)$$

$$\vdots$$

$$m_n(i, j) = \frac{1}{n}\sum_{k=1}^{n} I_k(i, j) = \frac{1}{n}I_n(i, j) + \frac{n-1}{n}m_{n-1}(i, j),$$

where $I_n(i,j)$ represents the image pixel value at pixel location (i,j) in the corrected current image frame (frame n); $m_n(i,j)$ is the temporal average of pixel (i,j) accumulated from the first frame (frame 1) up to the corrected current frame (frame n).

Next, temporal mean (M) of the pixel squares of pixel (i,j) of the frames of the frame sequence is computed as:

$$M_1(i, j) = I_1(i, j) \cdot I_1(i, j) = [I_1(i, j)]^2$$

$$M_2(i, j) = \frac{1}{2}([I_1(i, j)]^2 + [I_2(i, j)]^2) = \frac{1}{2}[I_2(i, j)]^2 + \frac{1}{2}M_1(i, j)$$

$$\vdots$$

$$M_n(i, j) = \frac{1}{n}\sum_{k=1}^{n} [I_k(i, j)]^2 = \frac{1}{n}[I_n(i, j)]^2 + \frac{n-1}{n}M_{n-1}(i, j),$$

and pixel variance of a pixel (i,j) of the corrected current frame n ($var_n(i,j)$), which is defined as mean of pixel squares subtracted by square of pixel mean, is computed as:

$$var_n(i,j)=E[I(i,j)^2]-(E[I(i,j)])^2=M_n(i,j)-[m_n(i,j)]^2.$$

Accordingly, temporal standard deviation of pixel (i,j) of the corrected current frame (frame n) is computed as the square root of its temporal variance:

$$\Sigma_n(i,j)=\sqrt{var_n(i,j)}=\sqrt{M_n(i,j)-[m_n(i,j)]^2}$$

Based on the above-computed temporal statistics of the pixels in the corrected current frame, bad pixels in the current frame are identified and the dead pixel map is updated accordingly. For example, a pixel (i,j) is identified as a bad pixel if the temporal mean of the pixel, m(i,j), when compared to the averaged temporal mean ($\overline{m}$) for the entire current frame (captured by the detector array), is greater than a threshold. In some embodiments, threshold is calculated as function of the average temporal sigma ($\overline{\Sigma}$). This comparison to update the value in dead pixel map 410 can be mathematically represented as:

$$D(i, j) = 1 \text{ if } |m(i, j) - \overline{m}| > a \cdot \overline{\Sigma}$$

$$\overline{m} = \frac{\sum_{u=1}^{nr} \sum_{v=1}^{nc} m(u, v)}{\sum_{u=1}^{nr} \sum_{v=1}^{nc} (1 - D(u, v))}$$

$$\overline{\Sigma} = \frac{\sum_{u=1}^{nr} \sum_{v=1}^{nc} \Sigma(u, v)}{\sum_{u=1}^{nr} \sum_{v=1}^{nc} (1 - D(u, v))}$$

$$a \approx 5,$$

where nr and nc are the number of rows and columns of the matrix including the pixel values of the current frame; and a is a scaling factor (e.g., equal to 5). In some embodiments, a pixel (i,j) may be identified as a bad pixel, if its temporal sigma, $\Sigma(i,j)$, is extremely high compared to the average temporal sigma from the local region (defined, as discussed above, as a rectangular region $(2w+1) \times (2h+1)$ centered at the pixel (i,j)). Such bad pixel identification, and updating of the corresponding dead pixel map value may be represented mathematically as:

$$D(i, j) = 1 \text{ if } \Sigma(i, j) > d \cdot \overline{\Sigma}(i, j)$$

$$\overline{\Sigma}(i, j) = \frac{\sum_{u=i-w}^{i+w} \sum_{v=j-h}^{j+h} \Sigma(u, v)}{\sum_{u=i-w}^{i+w} \sum_{v=j-h}^{j+h} [1 - D(u, v)]}$$

$$d \approx 10, \text{ where } d \text{ is a scaling}$$

factor (e.g., equal to 10). Similarly, a pixel (i,j) is identified as a noisy pixel if the pixel's temporal variance, $\Sigma_n(i,j)$, is much larger than the average temporal sigma ($\overline{\Sigma}$) from the entire detector array. Threshold may be calculated as function of the standard deviation (stdev) of temporal sigma ($\Sigma$). This comparison to update the value in dead pixel map 410 can be mathematically represented as:

$$D(i, j) = 1 \text{ if } (\Sigma(i, j) - \overline{\Sigma}) > b \cdot stdev(\Sigma)$$

$$\text{mean}(\Sigma) = \frac{\sum_{u=1}^{nr} \sum_{v=1}^{nc} \Sigma(u, v)}{\sum_{u=1}^{nr} \sum_{v=1}^{nc} (1 - D(u, v))} = \overline{\Sigma}$$

$$stdev(\Sigma) = \sqrt{\frac{\sum_{u=1}^{nr} \sum_{v=1}^{nc} \Sigma(u, v)^2}{\sum_{u=1}^{nr} \sum_{v=1}^{nc} (1 - D(u, v))} - \overline{\Sigma}^2}$$

$$b \approx 5,$$

where b is a scaling factor (e.g., equal to 5). Additionally, or alternatively, a pixel (i,j) is identified as a dead pixel if the pixel's temporal sigma, $\Sigma(i,j)$, is extremely low compared to the mean temporal sigma ($\overline{\Sigma}$) computed from the entire detector array. Mathematically, this can be represented as:

$$D(i,j)=1 \text{ if } \Sigma(i,j) < c \cdot \overline{\Sigma}$$

$$c \approx 0.01,$$

where c is a scaling factor (e.g., equal to 0.01). One or more of the above-discussed methods of bad pixel identification are used to update the entire dead pixel map 410, which is provided as an input to gradient-calculation (GC) module 412, and also to bad pixel replacement (BPR) module 414. In some embodiments, BPR module 414 is configured to replace each of the detected bad pixels (as indicated in dead pixel map 410) with the median (or, in the alternative, mean) of the pixel values of the bad pixel's neighboring pixels (e.g., pixels which are not identified as bad pixels, and are one or two pixel away on the left, right, up or down of the bad pixel being replaced).

Using adder 416, a delta image frame ($\Delta$) is generated by differencing the current and previous frames. The delta frame is provided as an input to GC module 412 and to motion detection module 418. In some embodiments, GC module 412 is configured to calculate gradient matrices of the corrected current frame, the corrected previous frame and the delta frame. For example, GC module 412 may compute a gradient matrix (or gradient frame) for each of input frames using shifted frame differencing. Shifted frame differencing which may be defined as shifting the entire frame (for which the gradient matrix is being calculated) by one (or more) pixel in one direction (e.g., left, right, up, or down), and computing the difference of the input frame and the shifted frame. In some embodiments, GC module 412 is configured to compute a gradient matrix ($\nabla$) of the corrected previous frame ($I_{prev}$) in a first direction (e.g., by shifting the corrected previous frame in the "left" direction), and compute a gradient matrix of the corrected current frame ($I_{curr}$) in a second direction, which is opposite to the first direction (e.g., by shifting the corrected current frame in the "right" direction). When there is frame-to-frame scene motion, local scene gradient information may move to neighboring pixels in the direction of motion. Such gradient shifts may be easily detected from gradient analysis on the delta frame. Accordingly, the GC module 412 may be further configured to compute gradient matrices of the delta frame ($I_{delta}$) in both the first and second directions. These gradient matrix calculations may be represented mathematically as below:

$$\nabla_{prev}^{Left}(i,j) = I_{prev}(i,j) - I_{prev}(i,j-1)$$

$$\nabla_{curr}^{Right}(i,j) = I_{curr}(i,j) - I_{curr}(i,j+1)$$

$$\nabla^{Left}\Delta(i,j) = I_{delta}(i,j) - I_{delta}(i,j-1)$$

$$\nabla^{Right}\Delta(i,j) = I_{delta}(i,j) - I_{delta}(i,j+1) \quad (3)$$

Also, to prevent bad pixel values being calculated in the gradient matrix calculations (and eventually into offset correction value calculations), GC module 412 uses bad pixel map 410 to set values in the above-computed gradient matrices equal to zero, if a pixel (i,j) (or its immediate left or right neighboring pixel) is identified as a bad pixel in dead pixel map 410 (i.e., D(i,j)=1). This can be represented mathematically as:

$$\nabla_{Left}(i,j)=0 \text{ if } D(i,j)=1 \text{ or } D(i,j-1)=1$$

$$\nabla_{Right}(i,j)=0 \text{ if } D(i,j)=1 \text{ or } D(i,j+1)=1$$

The gradient matrices of the corrected previous frame, corrected current frame, and delta frame are provided as input to local gradient processing (GP) module 420. In some embodiments, GP module 420 is configured to process the input gradient matrices to identify scene spatial and temporal gradients (or details), so that local scene information (in both first and second directions) is preserved (i.e., is not degraded or erased), and is excluded from offset correction value calculation. Outputs of GP module 420 are masks (one for each current and previous frames), which are matrices of the same size as current and previous frames, respectively, and include ones and zeros as values therein. A value equal to one at location (i,j) in such masks represents a pixel (i,j) (in the corresponding current or previous frame) and/or its neighboring pixels having scene gradient information, which is to be excluded for offset correction value calculation. Values equal to zero in the masks represent the pixels which may be affected by the fixed pattern noise (FPN) in the corresponding frame, and therefore, are to be corrected using offset correction values (calculated using gradient values). In some embodiments, GP module 420 is configured to generate a first mask by comparing values of the (above-discussed) gradients with a threshold value, which may be calculated and provided by threshold calculation (TC) unit 422, or may be pre-calculated and stored in memory 14a for access by GP module 420.

Following is a description of how a threshold for GP module 420 is computed using motion detection module 418 and TC unit 422. In some embodiments, TC unit 422 is configured to calculate a threshold (T) as a function of a statistic of the "frame noise" of the delta frame. Frame noise may be noise in an image frame which is not temporally correlated, and may include pixel temporal noise, thermal noise, shot noise, and 1/f noise. Frame noise may be estimated when two consecutive frames (e.g., current and previous frames) are collected from a stationary scene. In a delta image frame computed from two such frames, both scene and fixed pattern noise (which may be temporally correlated) may be canceled. Accordingly, frame noise and a statistic (e.g., standard deviation, sigma) of the frame noise, i.e. frame noise sigma, may be calculated by TC unit 422 using the delta frame. However, if the scene moves between the two captured frames, frame noise sigma may still be estimated, given that moving pixels in the delta frame are identified (e.g., by motion detection module 418), and excluded from the frame noise sigma estimation process.

To compute frame noise sigma using the delta frame (received from adder 416) for a scene known to be stationary, a subset of pixels of the delta frame are selected. For example, boundary pixels of the matrix representing the delta frame are excluded from frame noise sigma calculation. Accordingly, the remaining pixels of the delta frame form a subset of the pixels used to compute frame noise sigma. Those remaining pixels may be first grouped into multiple (n) 60-element matrices. For each 60-element matrix, standard deviation is computed, and a set s including standard deviation values of n 60-element matrices is generated, such that:

$$s(i)=\text{stdev}(i^{th}\ 60\text{-element array})$$

$$i=1\ldots n.$$

Further, the set s may be sorted in a particular order and a specific percentile (e.g., $5^{th}$ percentile) of the values in set s may be used as the frame noise sigma. This percentile calculation may be represented mathematically as:

$$s'=\text{sorted}(s)$$

$$\sigma_{FN}=s'(n*0.05)*1.5$$

In the case of scene motion, as detected by motion detection 418, the pixels (and/or their neighboring pixels) corresponding to a scene gradient of the delta frame may also be excluded from frame noise sigma calculation. In TC unit 422, pixels with scene gradient may be identified by comparing pixel values of the delta frame with a local threshold, e.g., the local threshold may be equal to three to five times a temporal noise sigma, or two times previously-calculated frame noise sigma. Accordingly, the pixels having scene gradient are also excluded, and the remaining pixels of the delta frame are used to compute the frame noise sigma as discussed above.

As discussed above, motion module 418 may be configured to detect motion using the delta frame, which may be used for an accurate calculation of the frame noise sigma, and therefore, for the calculation of the threshold, T (to be used by GP module 420). To detect motion between the previous frame ($i_{prev}$) and the current frame ($I_{curr}$), these two frames may be represented as:

$$I_{prev}=g\cdot\Phi_1+o+w_1, \text{ and}$$

$$I_{curr}=g\cdot\Phi_2+o+w_2,$$

where, individually associated with the previous and current frames, $\Phi$ is scene flux value detected by the detector array, g is constant gain, o is pixel fixed pattern offset noise, and w is temporal noise. Accordingly, the delta frame (generated by adder 416) for such previous and current frames may be represented as:

$$\Delta=I_{curr}-I_{prev}=g\cdot(\Phi_2-\Phi_1)+(w_2-w_1)$$

As can be seen, detector fixed pattern offset noise (o) is canceled by this image frame differencing. If the scene is stationary, i.e. $\Phi_1\approx\Phi_2$, the delta frame may mostly include random temporal noise. However, if there is motion in the scene, scene gradient along the motion direction may trace out scene edges on the delta frame.

Based on the above-calculated delta frame ($\Delta$), motion may be detected by motion detection module 418 based on spatial statistics of the delta frame. For example, the mean absolute value of the delta frame may give a good indication for frame-to-frame scene variations. Accordingly, scene motion may be detected if the (absolute value of) spatial average of delta frame is greater than a fixed factor, f (e.g., f≈1.5 or 2) of the standard deviation of the frame noise, $\sigma_w$. Spatial average of delta frame may be computed as:

$$\overline{\Delta}=\frac{\sum_{i=1}^{nr}\sum_{j=1}^{nc}|[1-D(i,j)]\cdot\Delta(i,j)|}{\sum_{i=1}^{nr}\sum_{j=1}^{nc}[1-D(i,j)]}$$

where nr and nc are number of rows and columns, respectively, of the delta frame; and D is dead pixel map indicating pixel values that should be excluded in the calculation of scene statistics.

Additionally, or alternatively, motion may be detected by motion detection module 418 based on percentage of moving pixels. A pixel in the delta frame may be counted as a moving pixel, if the pixel value exceeds a local threshold. Such local threshold may be a function of the standard deviation of the frame noise, $\sigma_w$, in the delta frame. A second threshold may then be used to determine if a percentage of such moving pixels exceeds a motion threshold. These two threshold-comparisons are represented mathematically as:

(a) If $|\Delta(i,j)|>f^*\sigma_w$, where $f\approx2$, identify pixel as a moving pixel; and (b) If a percentage of moving pixels>m, where m≈1~2%, declare scene motion is detected.

However, sudden scene changes (e.g., sudden smoke or fog in front of the lens) may need to be differentiated from scene motion, so as to be properly excluded them from motion detection. For such differentiation, motion detection module 418 may be configured to detect motion, if the number of positive pixel values (nPositiveDelta) in the delta frame is approximately equal to the number of negative pixel values (nNegativeDelta). However, if either of those two number is greater than the other, i.e., (nPositiveDelta>>nNegativeDelta), or (nNegativeDelta>>nPositiveDelta), motion detection module 418 may detect scene change, as there may be a sudden and large scene temperature change, not necessarily caused by scene motion.

Refer to GP module 420 discussed above, GP module 420 may be configured to process scene gradient matrices from GC module 412, identify spatial and temporal scene gradients (or details), and locally disable the offset correction updates such that the scene details are not degraded or erased during the offset correction process. GP module 420 receives as inputs, gradient matrices, $\nabla_{prev}^{Left}$, $\nabla_{curr}^{Right}$, $\nabla^{Left}\Delta$, and $\nabla^{Right}\Delta$ from GC module 412, and generate a first mask matrix ($M^L$) based on the gradient matrix of the corrected previous frame, $\nabla_{prev}^{Left}$, and the gradient matrix of the delta frame in the "left" direction, $\nabla^{Left}\Delta$. Similarly, GP module 420 generates a second mask matrix ($M^R$) based on the gradient matrix of the corrected current frame, $\nabla_{curr}^{Right}$, and the gradient matrix of the delta frame in the "right" direction, $\nabla^{Right}\Delta$. Following is a description of the detail process related to the generation of the first mask matrix, but the same process may be used to generate the second mask matrix. Similarly, if the gradient matrices are computed using shifted frame differencing in the "up" and "down" directions (perpendicular to the "left" and "right" directions), similar mask matrices ($M^U$, $M^D$) may be computed using the process described below.

Figure 5A:
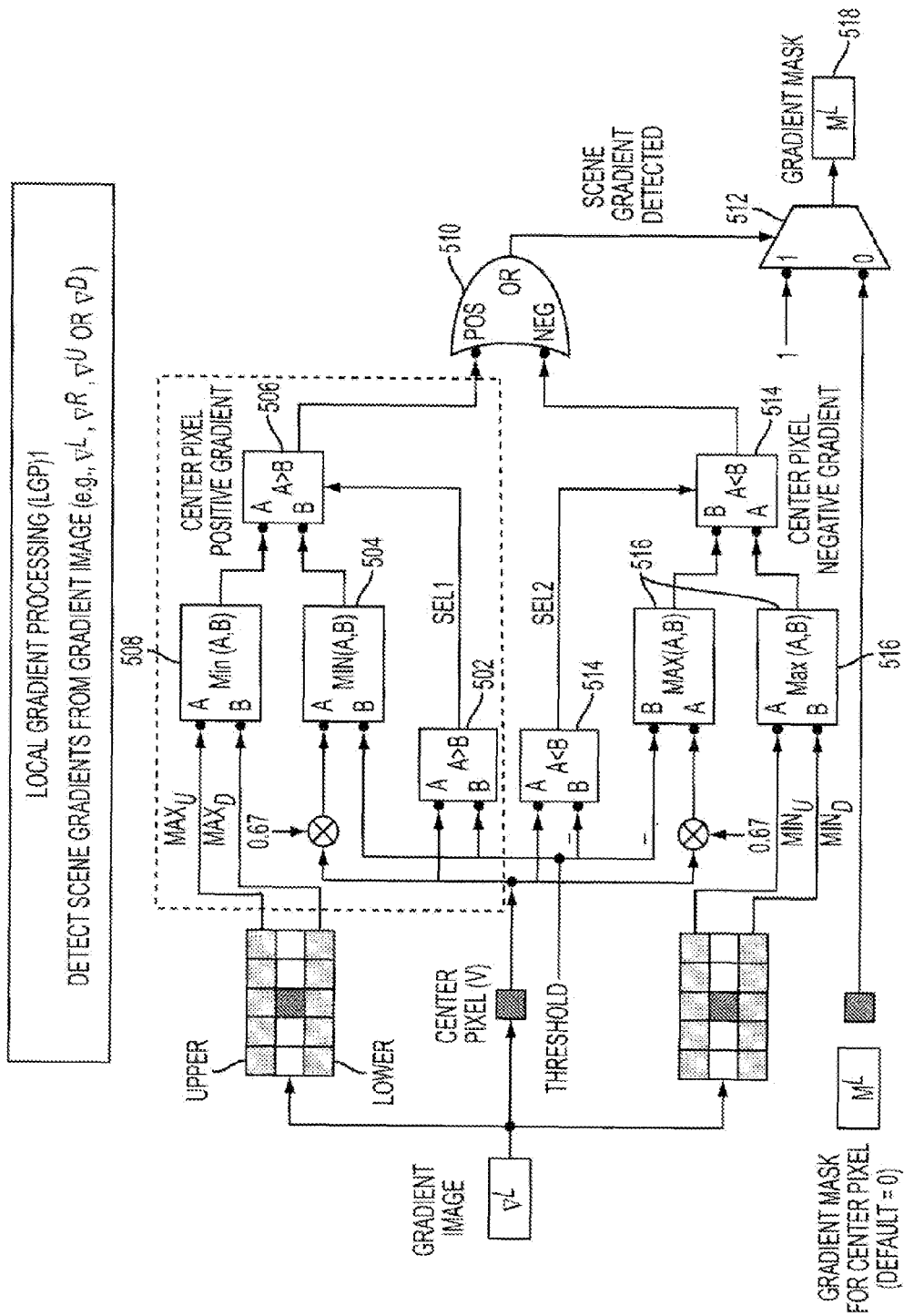
FIGS. 5a-5i are block diagrams of exemplary systems which perform various functions of a gradient processing module and a blinker detection module of FIG. 4 in accordance with an embodiment of this disclosure.

FIGS. 5a-5i illustrate steps in a local gradient processing (LGP) method used by GP module 420 (and blinker detection module 424) to generate first mask matrix, $M^L$. The first mask matrix (and other mask matrices) is initialized with all values of the matrix equal to zero. In some embodiments, the LGP method generates and/or updates a mask matrix on a pixel-by-pixel basis, and therefore, the following description is related to the processing of one pixel (labeled, e.g., as "center" pixel) of a gradient matrix (e.g., $\nabla_{prev}^{Left}$), and updating the corresponding location in the mask matrix. However, the LGP method is repeatedly executed for all pixels of the gradient matrix (i.e., $\nabla_{prev}^{Left}$) to completely generate the desired mask matrix. FIG. 5a shows a first step of the LGP method in which the center pixel value (V) of $\nabla_{prev}^{Left}$ is compared with a predetermined threshold, T received, e.g., from unit 422, in comparator 502 to produce signal, SEL1. Threshold, T may be equal to a scaled measured frame sigma noise (e.g. measured frame sigma noise multiplied by a constant factor, e.g., equal to 1, 2.5, 3.75 or 4), and SEL1 may indicate a value "1" if V is greater than T. Further, V may be multiplied by a constant factor, e.g., equal to 0.67, and the result provided to MIN unit 504. The other input of MIN unit 504 is threshold, T. MIN unit 504 may output minimum of the two inputs, as an input to another comparator 506. For the other input of comparator 506, pixels in the row above and row below the center pixel are examined. For example, in a sub-matrix of a fixed size around the center pixel, e.g., a sub-matrix extracted from within the gradient matrix $\nabla_{prev}^{Left}$ of size equal to 3×5 as shown, the maximum pixel value from the "upper" row ($MAX_U$) and the maximum pixel value from the "lower" row ($MAX_D$) are inputted to MIN unit 508. The minimum of $MAX_U$ and $MAX_D$ is provided as the other input to comparator 506, and if that value is found to be greater than the output of MIN unit 504 and if SEL1 is equal to 1, a signal indicating "1" is inputted to "Pos" input of OR gate 510. Pos input being equal to 1 may indicate (to-be-excluded) positive scene spatial gradient associated with the center pixel, and therefore, the corresponding value in the matrix, $M^L$ may be updated with value equal to 1, using a multiplexer 512. Comparator 502, 506 may be implemented identically or differently to perform said comparisons. Similarly, MIN units 504, 508 may have identical or different constructions to perform their respective functions.

Additionally, to identify negative scene gradient associated with the center pixel, other components including comparators 514 and MAX units 516 may be used in a manner similar to the process described above, but using negated threshold value (−T) and computing minimum of upper and lower rows of the sub-matrix. The resulting signal of this negative gradient identification is inputted to "Neg" input of OR gate 510. If the output of OR gate 510 is equal to 1, multiplexer 512 may be actuated to update the mask matrix $M^L$ 518 from initial value "0" to new value "1," indicating that the pixel of the corrected previous frame at the (row-column) location same as of the center pixel in gradient matrix $\nabla_{prev}^{Left}$, is to be excluded from computation of offset correction values.

Figure 5B:
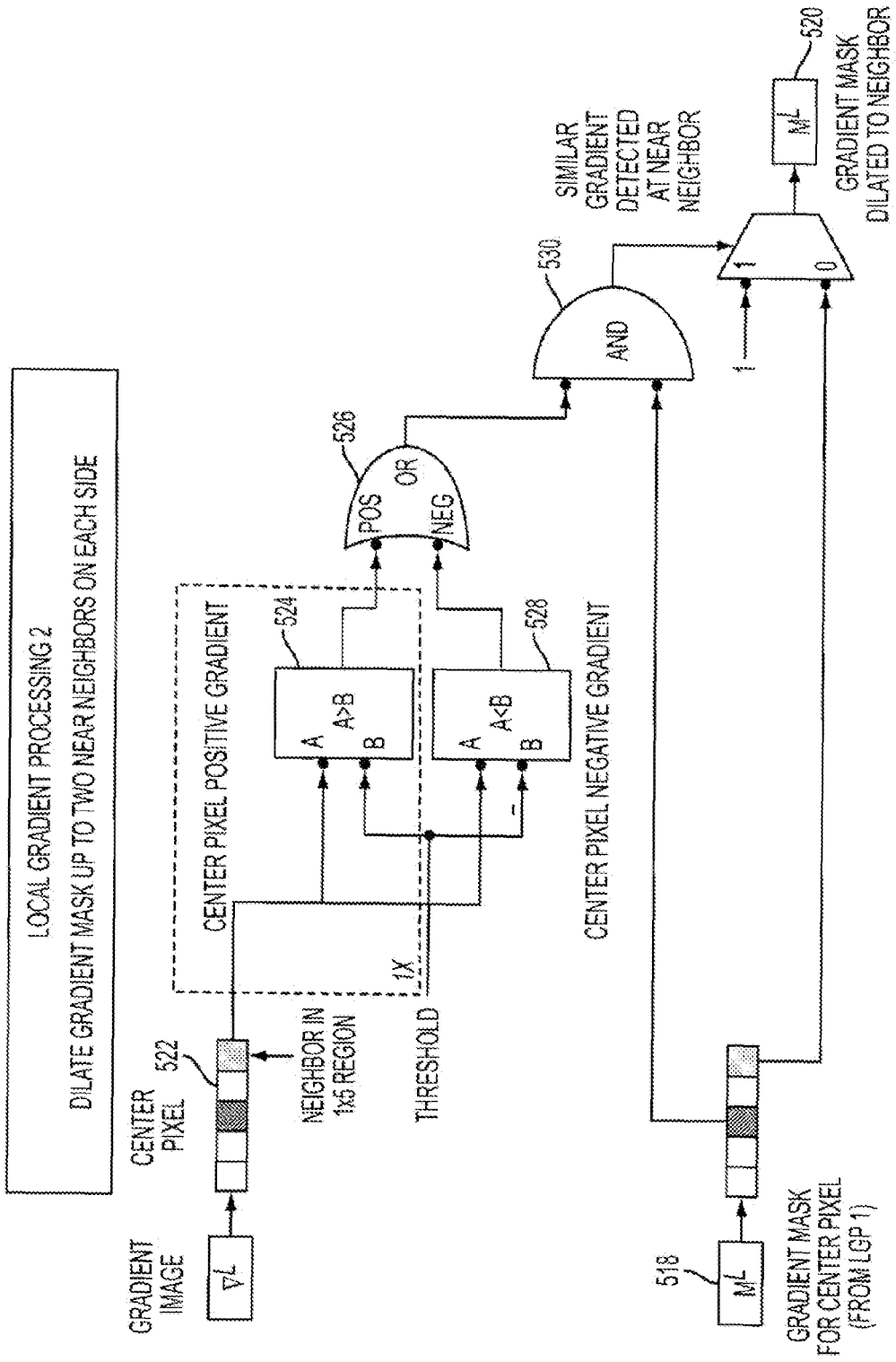

The first mask matrix, $M^L$ 518 may be "dilated," i.e., updated based on the determination if the values of the pixels neighboring the center pixel indicate scene gradient, to generate an updated matrix $M^L$ 520. Such dilation of mask matrix, $M^L$ 518 is shown in FIG. 5b, in which an one-dimensional local neighboring region (of the gradient image) 522 is defined, which includes the center pixel and e.g., two pixels on the left and two pixels on the right of the center pixel. Taking one pixel of region 522 at a time, the pixel value is provided as an input to comparator 524 to determine if it is greater than a threshold (e.g., equal to frame noise sigma from unit 422). The result of the comparison ("1" or "0") is provided as input "Pos" of OR gate 526. Similarly, "Neg" input of OR gate 526 is received from comparator 528. The binary output of OR gate and the mask matrix value of the center pixel from matrix 518 are inputted to AND gate 530. An output equal to "1" from AND gate 530 indicates scene gradient information also associated with the neighboring pixel, and therefore, the mask value corresponding to the neighboring pixel is also updated to 1 in matrix 520. Otherwise, the mask value of the neighboring pixel is unchanged from matrix 518 to matrix 520.

Figure 5C:
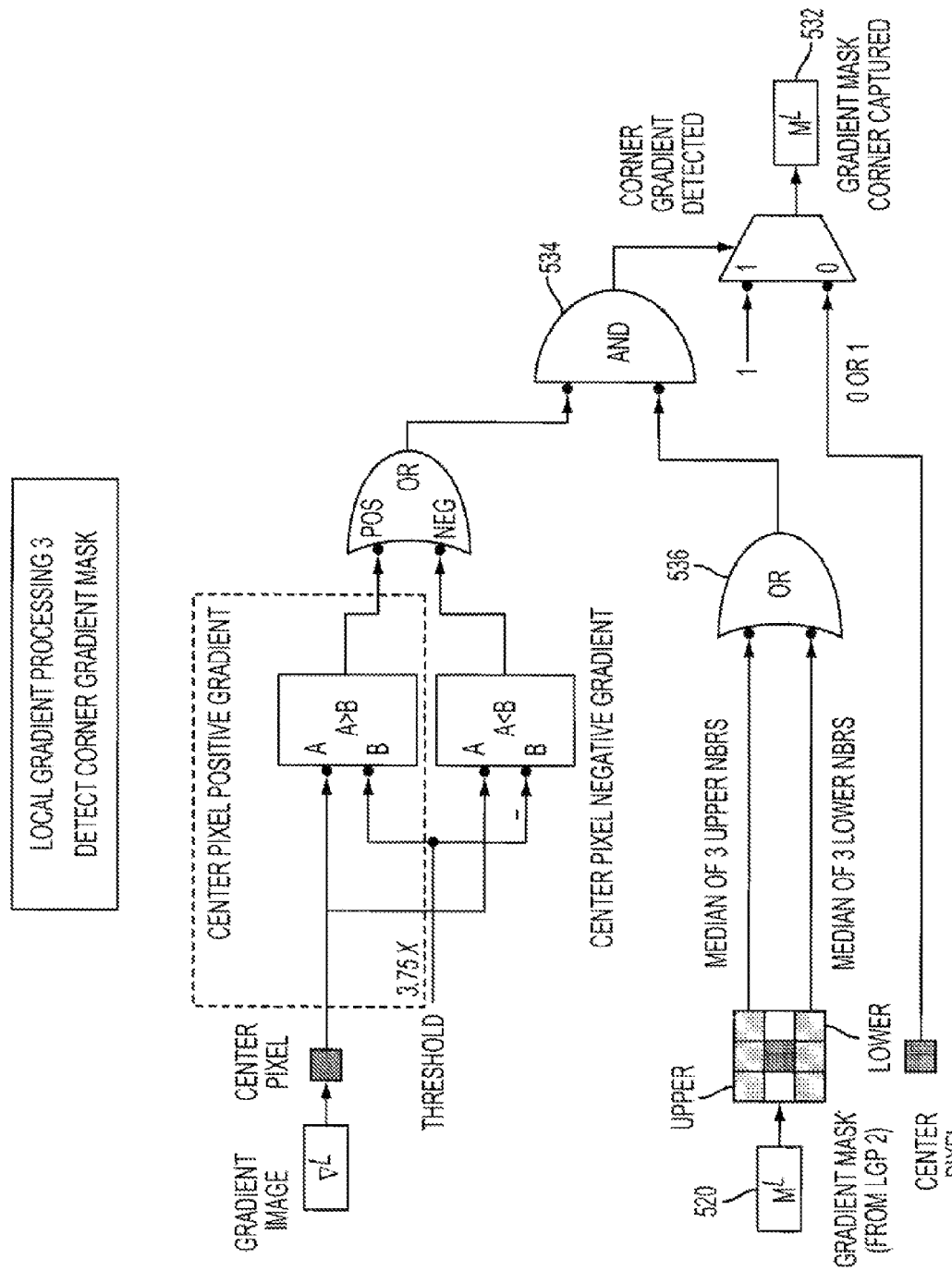

FIG. 5c shows a next step in the LGP process, in which "corner" gradient (i.e., having both horizontal and vertical edges in the neighboring region) of a center pixel of gradient matrix $\nabla_{prev}^{Left}$ is identified, and based on that, mask matrix, $M^L$ 520 is further updated to generate mask matrix 532. As shown, identification of the positive and negative gradients for the center pixel is performed using comparators and OR gate, in a manner similar to as described for FIG. 5a. The binary output of the OR gate is provided as an input to AND gate 534. As also shown, a sub-matrix is extracted from matrix 520 (e.g., a square sub-matrix of size 3×3). The sub-matrix may includes the mask value for the center pixel (as the center of the sub-matrix) and mask values neighboring around the center pixel-mask value. Medians of the mask values from "upper" row and "lower" row are inputted to OR gate 536, output of which is provided as the second input to AND gate 534. An output equal to "1" from AND gate 530 indicates corner scene gradient and therefore, the mask value corresponding to the center pixel is updated to 1 in matrix 532. Otherwise, the mask value of the center pixel is unchanged from matrix 520 to matrix 532.

Figure 5D:
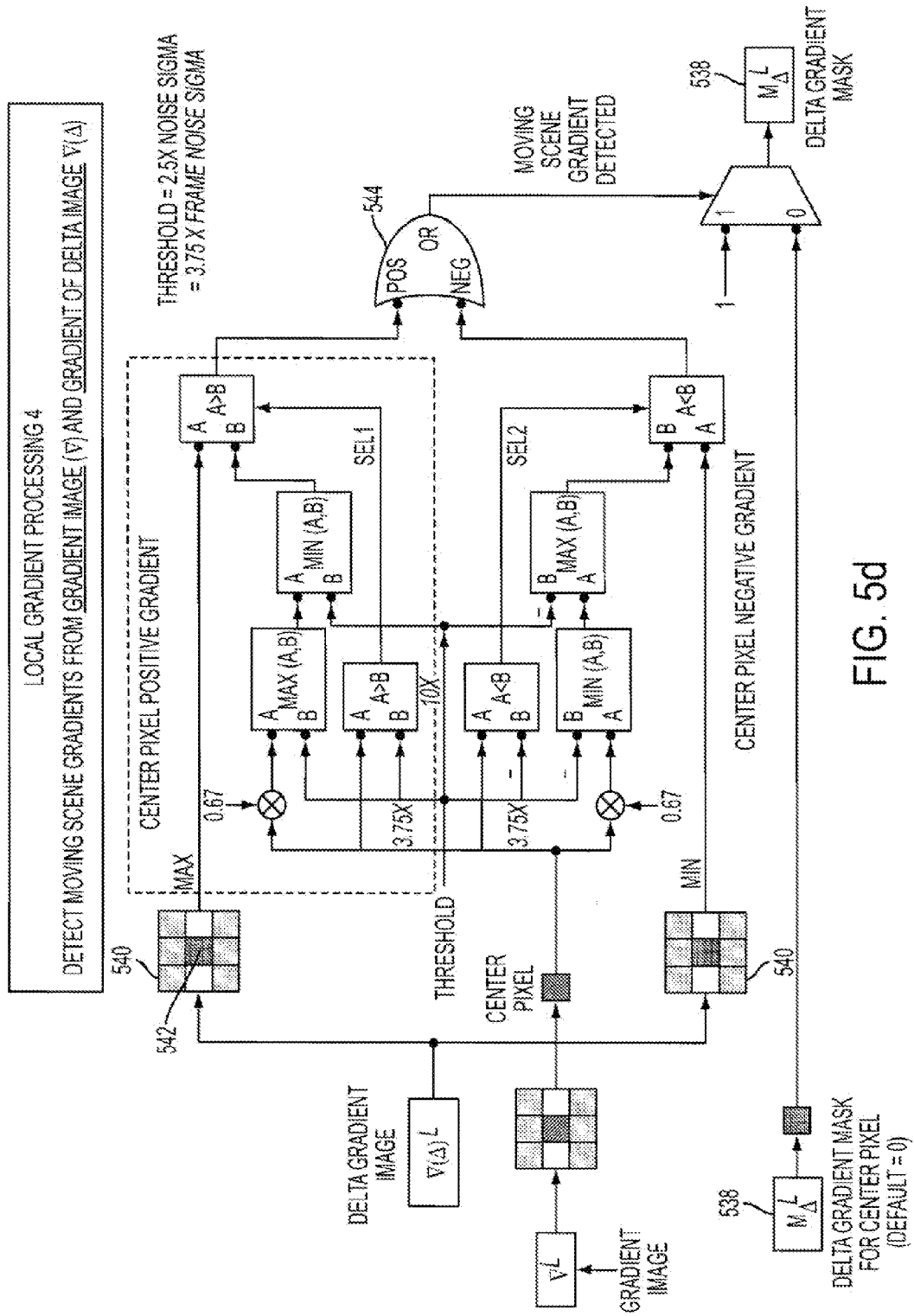
Figure 5E:
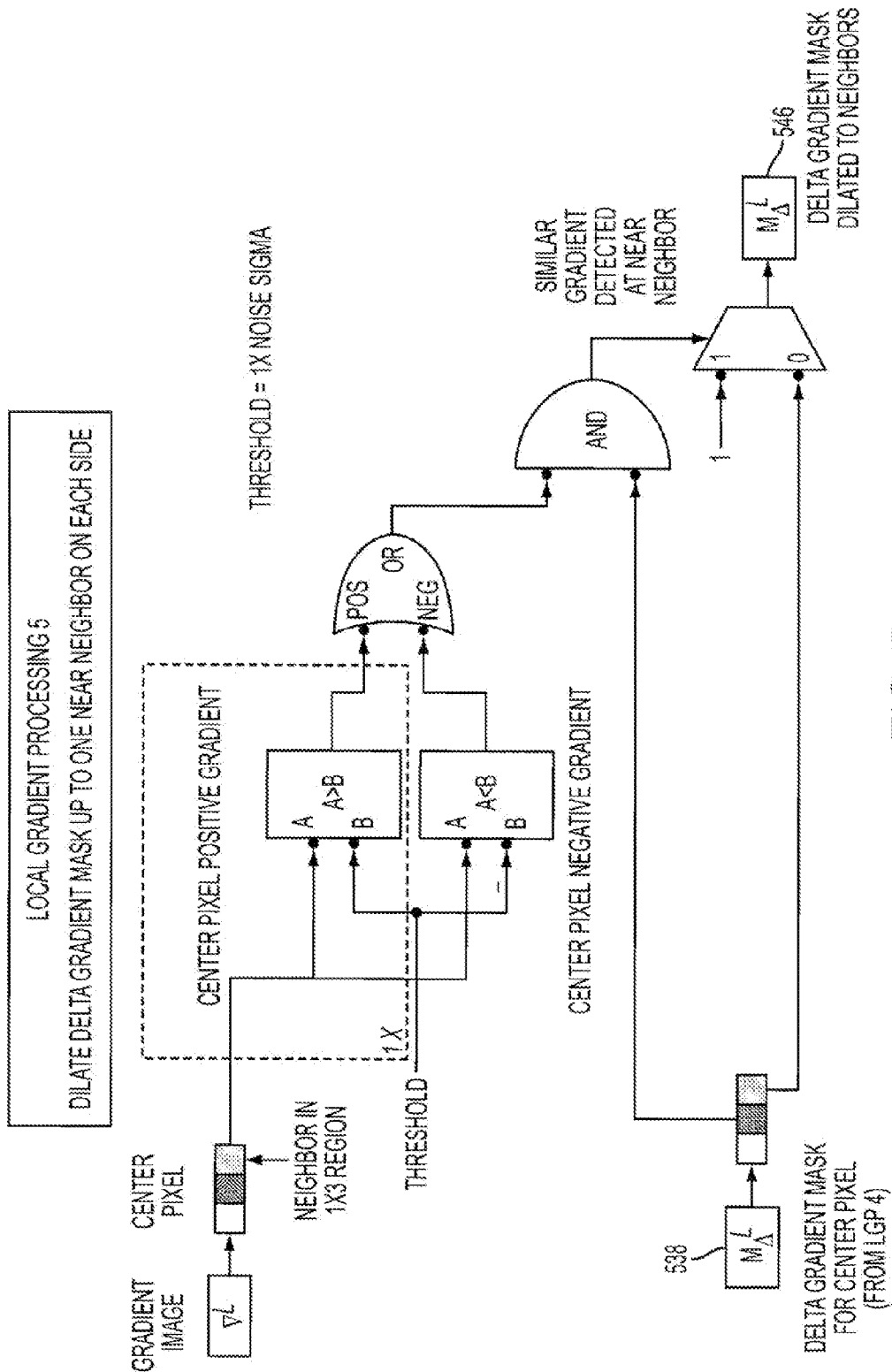

Next, to identify scene temporal gradient (related to scene movement), and update mask matrix accordingly, the gradient matrix of the corrected previous frame, $\nabla_{prev}^{Left}$ and the gradient matrix of the delta frame (in the "left" direction), $\nabla^{Left}\Delta$ are processed as shown in FIG. 5d. A delta-gradient mask matrix, $M_A^L$ 538 is initialized with all values equal to zero, and is updated as described below. For each center pixel of (and at location (i,j) in) matrix $\nabla_{prev}^{Left}$ at location (i,j), sub-matrix 540 is defined from within gradient matrix $\nabla^{Left}\Delta$. Sub-matrix 540 may be a square matrix of size, e.g., 3×3 (other sizes may be used), and may include, as central value 542, the value of matrix $\nabla^{Left}\Delta$ at location (i,j) and other (eight) values neighboring value 542. The center pixel and sub-matrix 540 may be processed, using comparators, MAX units, MIN units with their interconnections, e.g., as shown in FIG. 5d, to eventually determine the presence of (positive and/or negative) scene temporal gradient. Such temporal gradient may be preserved and reflected in updated delta-gradient mask matrix 538, based on the output of OR gate 544. As a next step, similar to the processing shown in and described for FIG. 5b, delta-gradient mask matrix 538 may be dilated based on scene temporal gradient information associated with (and identified for) the neighboring pixels. Such dilation of mask matrix 538 using, e.g., a neighboring region of size equal to three pixels to generate an updated delta-gradient mask matrix 546 is shown in FIG. 5e.

Figure 5F:
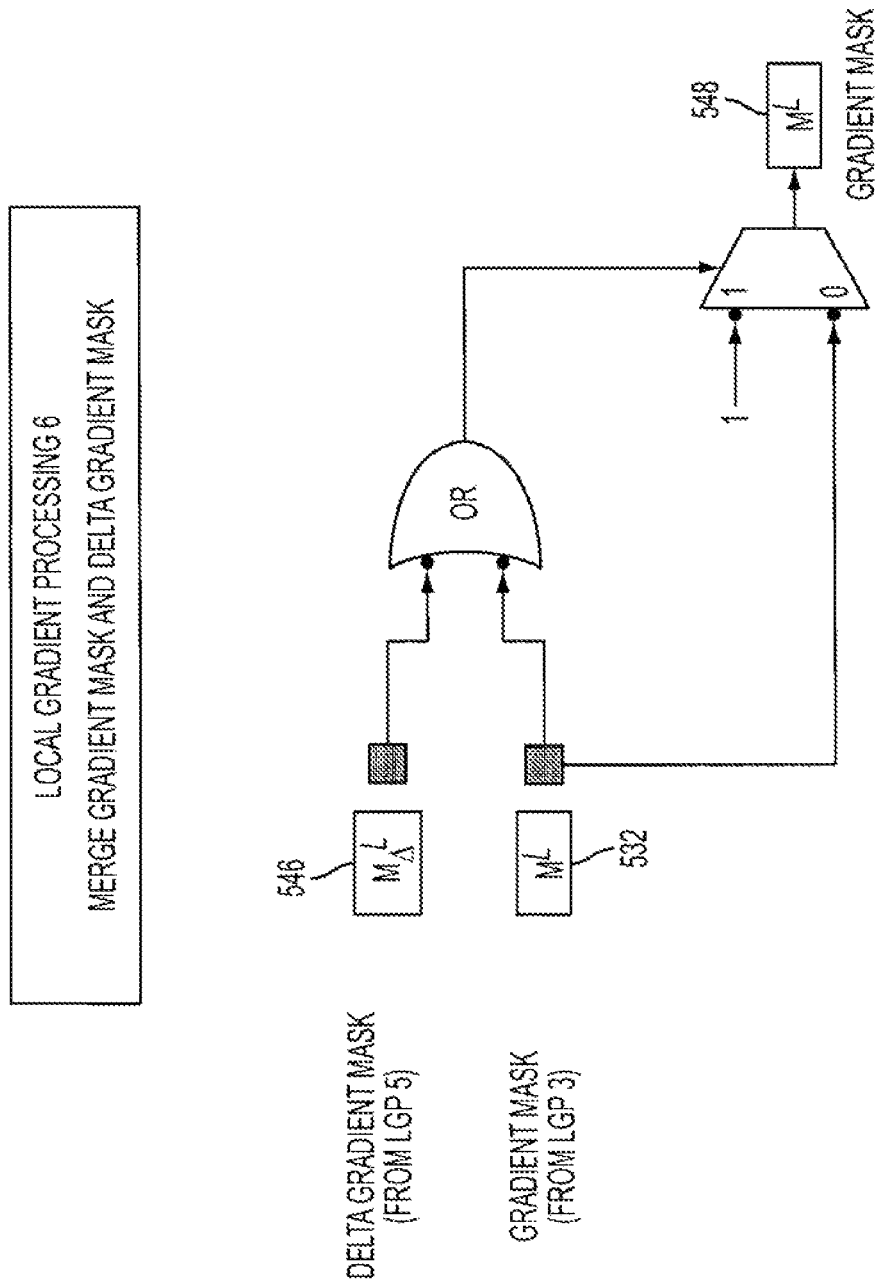

Subsequently, as shown in FIG. 5f, mask matrix 532 to preserve scene spatial gradients (from FIG. 5c) and mask matrix 546 to preserve scene temporal gradients (from FIG. 5e) are merged on a pixel-by-pixel basis, to generate a merged mask matrix 548 corresponding to gradient matrix $\nabla_{prev}^{Left}$.

Figure 5G:
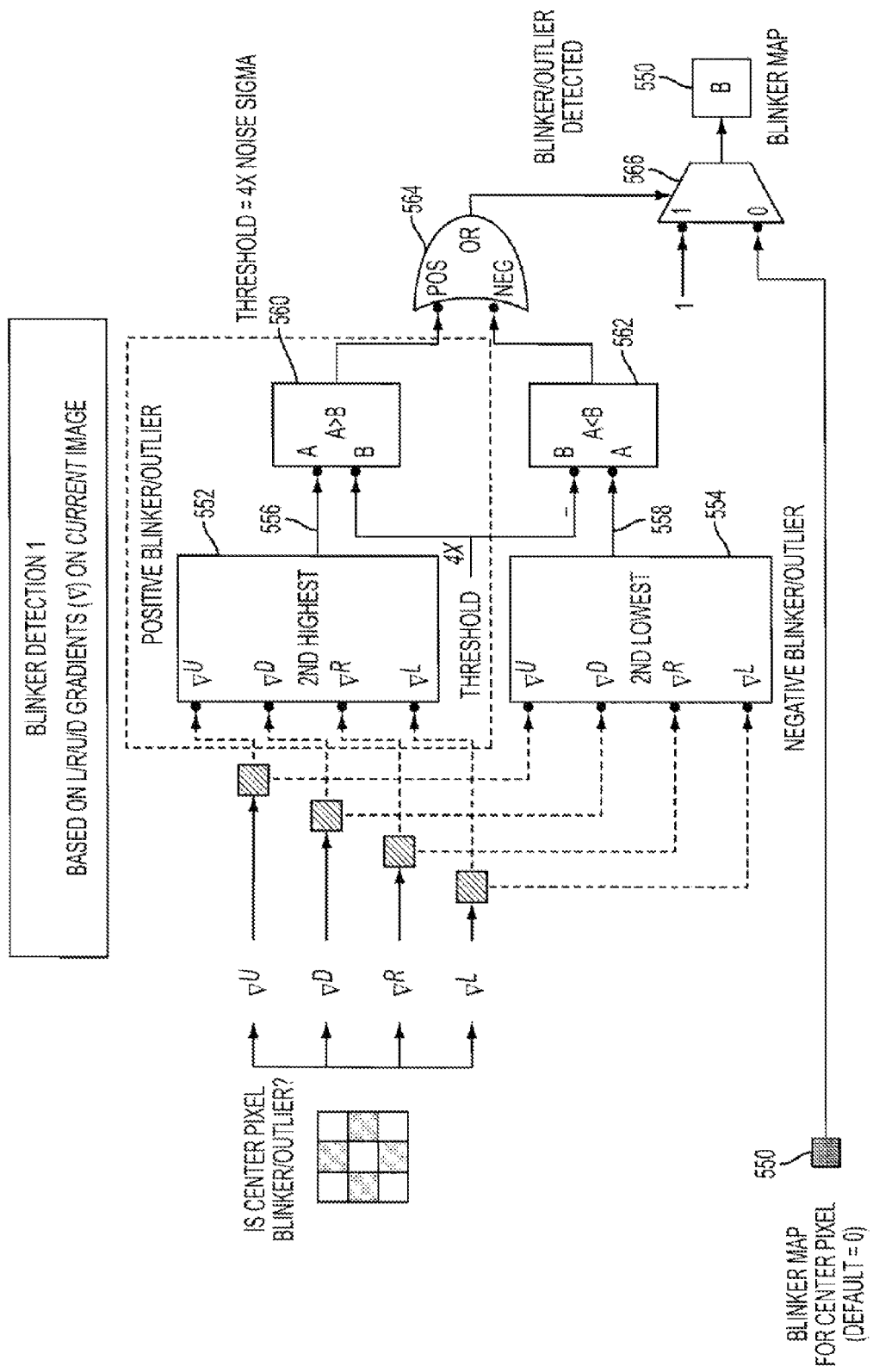

In some embodiments, one or more blinker pixels and/or outlier pixels may be present in the corrected previous frame (and/or corrected current frame). These blinker or outlier pixels are identified by blinker detection unit 424, and tracked using a "blinker" map 550 (initialized as a matrix with all zero values), as shown in FIG. 5g. Detected blinker pixels may be eventually used to update mask matrix 548, such that gradients corresponding to blinker pixels are masked properly for offset correction value calculations. For blinker detection, first, gradients for the corrected current frame are calculated in four directions, i.e., gradients ($\nabla^L \nabla^R \nabla^U \nabla^D$) calculated by shifted frame differencing (eq. 3) in left, right, up and down directions. Detecting blinker pixels on pixel-by-pixel basis, these four gradients for a center pixel of the detector array are provided as inputs to units 552, 554. Unit 552 may be configured to compare the four gradients, and output the second highest of those gradients (556) for positive blinker detection. Similarly, unit 554 may provide the second lowest of those four gradients (558) for negative blinker detection. Gradient 556 may be compared with a threshold, T (e.g., equal to 4×frame noise sigma) using comparator 560, which may output the result to OR gate 564. Similarly, gradient 558 may be compared with −T using comparator 562, and the result of the comparison is inputted to OR gate 564. Based on the determination that a positive blinker or a negative blinker has been identified, OR gate 564 will provide an output signal to actuate multiplexer 566, and accordingly update blinker map 550 with a "1." Otherwise, blinker map value remains unchanged to its initial value ("0").

Figure 5H:
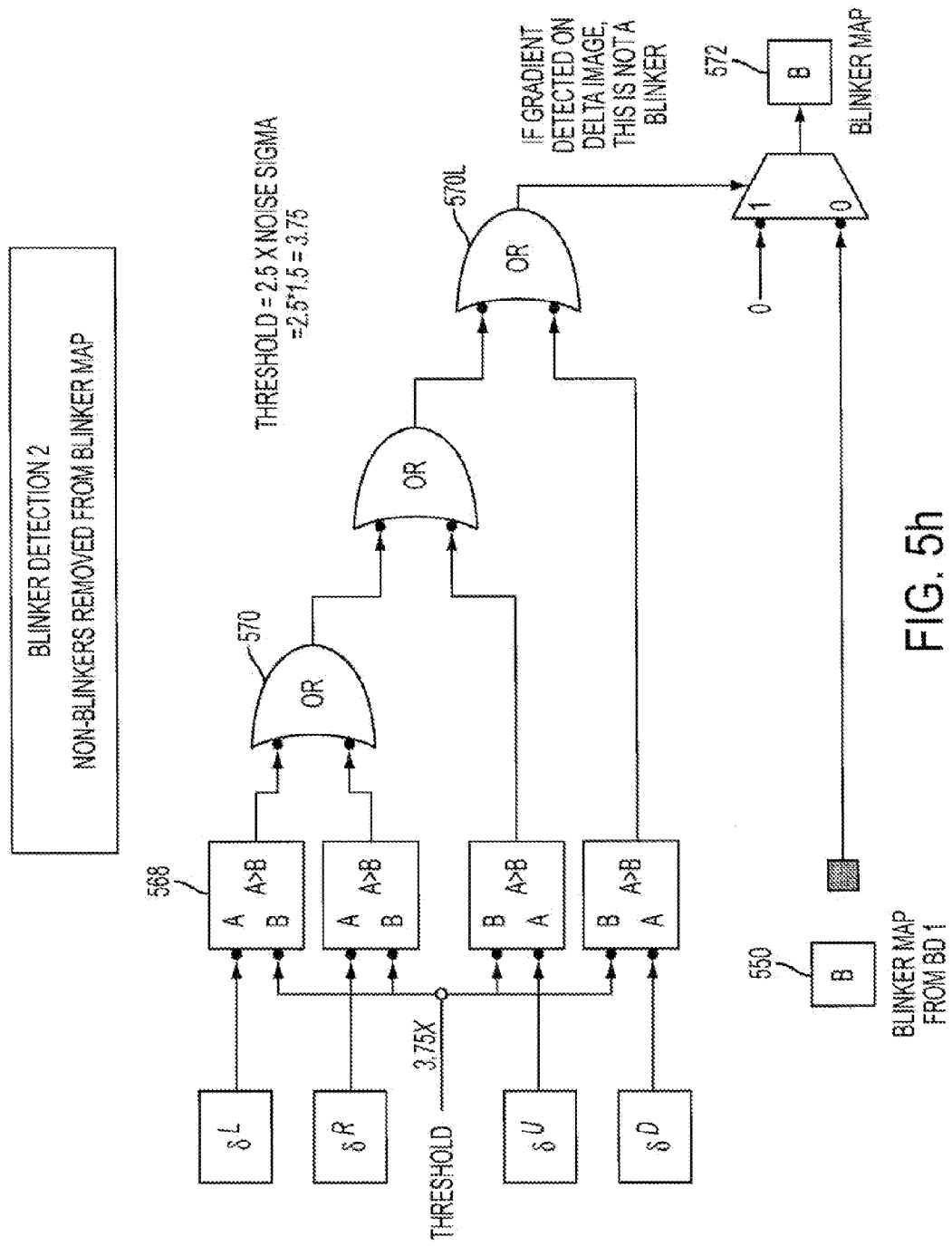

In some embodiments, low-pass filtered gradient matrices of the delta frame may used to further refine blinker map 550 (and generate a new blinker map 572). Matrices $\delta^L, \delta^R, \delta^U, \delta^D$ shown in FIG. 5h are gradient matrices obtained after low-pass filtering of delta-frame gradient matrices in the left, right, up, and down directions ($\nabla^L\Delta$, $\nabla^R\Delta$, $\nabla^U\Delta$, $\nabla^D\Delta$), respectively. Each value from these low-pass filtered gradient matrices is compared with a threshold (e.g., equal to 3.75) using comparators 568, and through a series of OR gates 570 interconnected as shown in FIG. 5h, results of the comparisons reflect if a particular pixel is a blinker pixel or a pixel with to-be-preserved gradient. Based on the output of the last OR gate 570L, blinker map 550 is updated by changing the value in the map from "1" to "0," if the pixel is not a blinker pixel but has gradient information. Otherwise, the blinker map value is left unchanged.

Figure 5I:
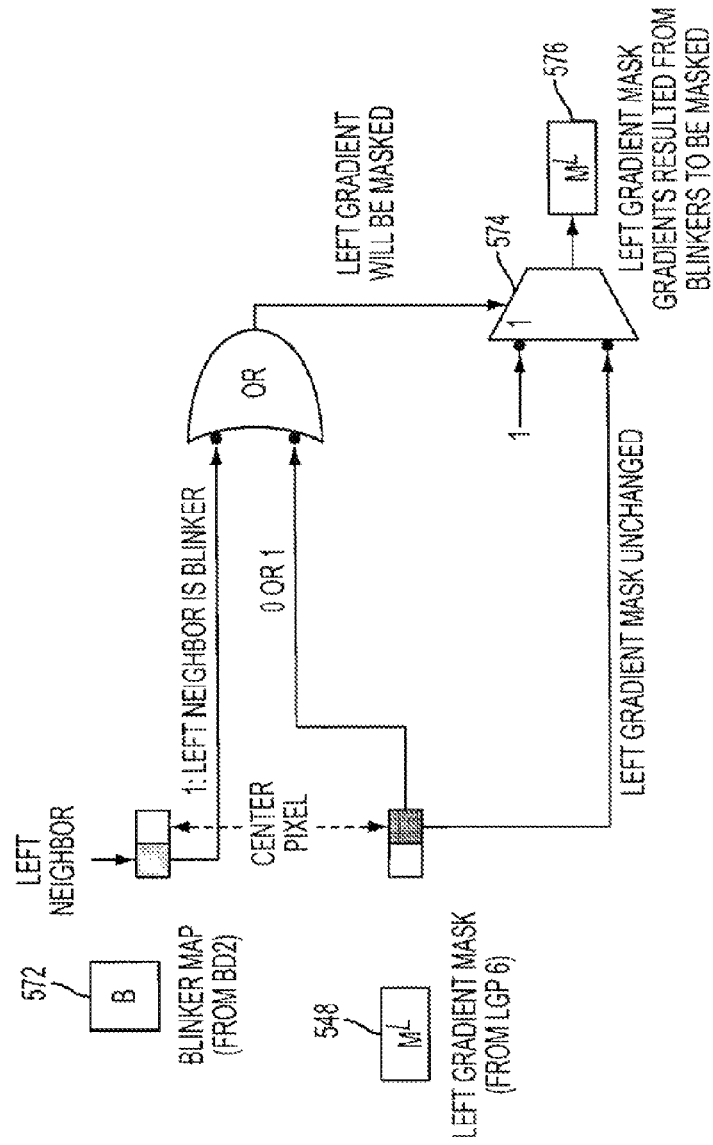

As a final step in the LGP process, mask matrix, $M^L$ 548 (from FIG. 5f) may be revised with blinker map 572 (from FIG. 5h) as shown in FIG. 5i. For each center pixel at location (i,j) in mask matrix 548, value of blinker map 572 at a location adjacent to (or neighboring) location (i,j) (e.g., left adjacent neighbor value) is OR-ed with the mask value of the center pixel. Accordingly, if the blinker map value at the neighboring location indicates a blinker pixel in that location (i.e., value=1), the mask matrix value at location (i,j) is updated to "1" through multiplexer 574. Otherwise, the mask value for the center pixel is left unchanged. The above-described process to revise mask values is repeated for all values of mask matrix 548, and the revised mask matrix 576 corresponding to gradient matrix $\nabla_{prev}^{Left}$ is obtained. As mentioned above, mask matrices for other gradient matrices (e.g., mask matrix $M^R$ for gradient matrix $\nabla_{curr}^{Right}$) may be obtained by the process shown in, and described for FIGS. 5a-5i.

Referring back to FIG. 4, at delta-offset correction unit 426, gradient matrices for the corrected previous and corrected current frames along with the corresponding mask matrices are used to compute delta-offset correction values. The delta-offset correction values may be computed using the following equation:

$$\Delta OC = \frac{\alpha}{4}[(1-M^L)\cdot\nabla_{prev}^{Left} + (1-M^R)\cdot\nabla_{curr}^{Right}],$$

where $0 \leq \alpha \leq 1$. Thereafter, offset correction (OC) values previously calculated and stored in correction terms memory 406 may be updated in offset update unit 428 as follows:

$$OC = OC + \Delta OC$$

The updated correction values may be stored back in correction terms memory 406 to be applied to a next set of the previous and current frames, and to be accessed for further revisions using system 400.

In one embodiment, for the next set of previous and current frames, the above-discussed technique to update offset correction values is performed using mask and gradient matrices which are calculated by shifting the relevant image frames in third and fourth directions that are perpendicular to the first and second directions. For example, for the next set of previ ous and current frames, the delta-offset correction values may be computed using the following equation:

$$\Delta OC = \frac{\alpha}{4}[(1-M^U)\cdot\nabla_{prev}^{Up} + (1-M^D)\cdot\nabla_{curr}^{Down}],$$

where $0 \leq \alpha \leq 1$; $M^U$ and $M^D$ are mask matrices computed for "up" and "down" directions (that are perpendicular to the "left" and "right" directions), respectively, using the techniques discussed above (and illustrated in FIGS. 5a-5i); and similarly, $\nabla_{prev}^{Up}$ and $\nabla_{curr}^{Down}$ are gradient matrices computed for the "up" and "down" directions using the following equations:

$$\nabla_{Up}(i,j) = I(i,j) - I(i-1,j)$$

$$\nabla_{Down}(i,j) = I(i,j) - I(i+1,j),$$

where I is the matrix representing an image frame (e.g., current frame or previous frame).

Although modules and units in system 400 are shown as individual components, in one or more embodiments, these modules and units may be combined into just one or two devices. In another embodiment, one or more modules and/or units of system 400 may be operational on a chip in one system, and one or more of the other modules and units may be part of another system, which is located geographically remotely from chip including the one or more modules. If the one or more modules are located remotely from the other modules of system 400, the modules may be operatively connected through a wired or wireless network (not shown) using necessary interfaces and components. Such network may include one or more of a private TCP/IP network, the Internet, or a private or public radio frequency (RF) network.

The invention claimed is:

1. A ditherless method of compensating non-uniformities among detector elements of a detector array that captures successive image frames of a scene, where each detector element of the array has at least one neighbor, the method comprising:
   (i) receiving a current image frame from the detector array and a previous image frame from an image frame memory, wherein the current and previous frames are image frames captured by the detector array at different times and which are represented as respective matrices each containing image pixel values representing output signals from the detector array;
   (ii) applying, at a correction unit, a plurality of predetermined correction terms to the current frame and the previous frame to generate a corrected current frame and a corrected previous frame;
   (iii) generating, at a delta-frame unit, a delta frame using the current frame and the previous frame;
   (iv) computing, at a gradient-calculation unit, a previous-frame gradient matrix of the corrected previous frame in a first direction, a current-frame gradient matrix of the corrected current frame in a second direction, and a first delta-frame gradient matrix in the first direction and a second delta-frame gradient matrix in the second direction of the delta frame, wherein the second direction is opposite to the first direction;
   (v) computing, at a gradient-processing unit, a first mask using the previous-frame gradient matrix and the first delta-frame gradient matrix, and a second mask using the current-frame gradient matrix and the second delta-frame gradient matrix, wherein the first mask preserves scene-gradient information of a scene associated with the corrected previous frame in the first direction, and the second mask preserves scene-gradient information associated with the corrected current frame in the second direction;
   (vi) computing, at a delta-correction unit, a plurality of delta-correction values as a function of the previous-frame gradient matrix, the current-frame gradient matrix, and the first and second masks, wherein each of the plurality of delta-correction values is associated with a different one of the detector elements of the array; and
   (vii) updating, at an update unit, each of the plurality of predetermined correction terms with a corresponding delta-correction value.

2. The method of claim 1, wherein the detector array comprises a one-dimensional linear array.

3. The method of claim 1, further comprising using local scene data to compensate for non-uniformities for only a portion of detector elements of the detector array.

4. The method of claim 1, wherein the detector array comprises a two-dimensional planar array.

5. The method of claim 4 further comprising repeating steps (iv) through (vii) for third and fourth directions perpendicular to the first and second directions, respectively.

6. The method of claim 1, wherein computing the first mask includes comparing values of the previous-frame gradient matrix and values of the first delta-frame gradient matrix with a predetermined threshold value.

7. The method of claim 6, wherein computing the second mask includes comparing values of the current-frame gradient matrix and values of the second delta-frame gradient matrix with the predetermined threshold value.

8. The method of claim 7, wherein the threshold value is a function of frame noise of the delta frame.

9. A system for compensating non-uniformities among detector elements of a detector array that captures successive image frames of a scene, where each detector element of the array has at least one neighbor, the system comprising:
   (i) an image frame memory that provides a previous image frame, wherein both the previous image frame and a current image frame provided by the detector array are image frames captured by the detector array at different times and are represented as respective matrices each containing image pixel values representing output signals from the detector array;
   (ii) a correction unit that applies a plurality of predetermined correction terms to the current frame and the previous frame to generate a corrected current frame and a corrected previous frame;
   (iii) a delta-frame unit that generates a delta frame using the current frame and the previous frame;
   (iv) a gradient-calculation unit that computes a previous-frame gradient matrix of the corrected previous frame in a first direction, a current-frame gradient matrix of the corrected current frame in a second direction, and a first delta-frame gradient matrix in the first direction and a second delta-frame gradient matrix in the second direction of the delta frame, wherein the second direction is opposite to the first direction;
   (v) a gradient-processing unit that computes a first mask using the previous-frame gradient matrix and the first delta-frame gradient matrix, and a second mask using the current-frame gradient matrix and the second delta-frame gradient matrix, wherein the first mask preserves scene-gradient information of a scene associated with the corrected previous frame in the first direction, and the second mask preserves the scene-gradient information associated with the corrected current frame in the second direction;
- (vi) a delta-correction unit that computes a plurality of delta-correction values as a function of the previous-frame gradient matrix, the current-frame gradient matrix, and the first and second masks, wherein each of the plurality of delta-correction values is associated with a different one of the detector elements of the array; and
- (vii) an update unit that updates each of the plurality of predetermined correction terms with a corresponding delta-correction value.

10. The system of claim 9, wherein the detector array comprises a one-dimensional linear array.

11. The system of claim 9, wherein local scene data is used to compensate for non-uniformities for only a portion of detector elements of the detector array.

12. The system of claim 9, wherein the detector array comprises a two-dimensional planar array.

13. The system of claim 12, wherein the system units (iv) through (vii) perform their respective functions for third and fourth directions perpendicular to the first and second directions, respectively.

14. The system of claim 9, wherein the gradient-processing unit computes the first mask by comparing values of the previous-frame gradient matrix and values of the first delta-frame gradient matrix with a predetermined threshold value.

15. The system of claim 14, wherein the gradient-processing unit computes the second mask by comparing values of the current-frame gradient matrix and values of the second delta-frame gradient matrix with the predetermined threshold value.

16. The system of claim 15, wherein the threshold value is a function of frame noise of the delta frame.

* * * * *